US012811327B2

(12) United States Patent
Matsuo

(10) Patent No.: US 12,811,327 B2
(45) Date of Patent: Nov. 24, 2026

(54) CONNECTOR AND CONNECTOR ASSEMBLY

(71) Applicant: Japan Aviation Electronics Industry, Limited, Tokyo (JP)

(72) Inventor: Seiya Matsuo, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 333 days.

(21) Appl. No.: 18/740,162

(22) Filed: Jun. 11, 2024

(65) Prior Publication Data

US 2025/0055216 A1 Feb. 13, 2025

(30) Foreign Application Priority Data

Aug. 7, 2023 (JP) ................................ 2023-128445

(51) Int. Cl.
*H01R 13/05* (2006.01)
*H01R 13/502* (2006.01)

(52) U.S. Cl.
CPC ......... *H01R 13/052* (2013.01); *H01R 13/502* (2013.01)

(58) Field of Classification Search
CPC .... H01R 13/052; H01R 13/502; H01R 12/59; H01R 12/65
USPC ........................................................ 439/701
See application file for complete search history.

(56) References Cited

U.S. PATENT DOCUMENTS

2018/0233854 A1* 8/2018 Komoto ................. H01R 12/69
2021/0075146 A1* 3/2021 Matsuo .............. H01R 13/5025
2021/0104824 A1* 4/2021 Hashiguchi .............. A44C 5/14

FOREIGN PATENT DOCUMENTS

JP 2018129244 A 8/2018

* cited by examiner

*Primary Examiner* — Tulsidas C Patel
*Assistant Examiner* — Thaslimur Rahman
(74) *Attorney, Agent, or Firm* — MUNCY, GEISSLER, OLDS & LOWE, P.C.

(57) ABSTRACT

A connector includes a plug contact having conductivity and including a flange extending in a direction orthogonal to a fitting axis, a bottom insulator having a support surface extending in a direction orthogonal to the fitting axis or a direction inclined with respect to the direction orthogonal to the fitting axis, and an inner contact having conductivity and being disposed on the support surface, the inner contact including a base portion of flat plate shape disposed on the support surface, a first elastic portion and a second elastic portion that are joined to the base portion to face a rear surface of the flange and are elastically deformable in a direction along the fitting axis.

12 Claims, 18 Drawing Sheets

CONNECTOR AND CONNECTOR ASSEMBLY

BACKGROUND OF THE INVENTION

The present invention relates to a connector, particularly to a connector that is connected to a sheet type connection object having a conductor exposed on at least one surface of the connection object.

The present invention also relates to a connector assembly in which the connector is connected to the connection object.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a conductor drawn from the electrode. As a connector of this type, for example, JP 2018-129244 A discloses a connector as shown in FIG. 47. This connector includes a housing 2 and a base member 3 that are separately disposed on opposite sides of a flexible substrate 1 to sandwich the flexible substrate 1. Tubular portions 4A of contacts 4 are passed through contact through-holes 2A of the housing 2, and flanges 4B of the contacts 4 are sandwiched between the housing 2 and conductors 1A exposed on the front surface of the flexible substrate 1.

In this state, by pushing the base member 3 toward the housing 2, as shown in FIG. 48, a projection 3A of the base member 3 is inserted into a projection accommodating portion 4C of the contact 4 with the flexible substrate 1 being sandwiched therebetween, and an inner surface of the projection accommodating portion 4C makes contact with the conductor 1A with a predetermined contact force, whereby the contact 4 is electrically connected to the conductor 1A.

Further, housing fixing posts 3B formed to project from the base member 3 are press-fitted into post accommodating portions 2B of the housing 2 as shown in FIG. 47, so that the housing 2 and the base member 3 are fixed to each other.

When a wearable device is fitted with the connector disclosed in JP 2018-129244 A, the wearable device can be connected to an electrode formed of a conductor.

However, when the conductor 1A is exposed on the rear surface of the flexible substrate 1, the connector of JP 2018-129244A is useless for electrically connecting the conductor 1A to the contact 4, disadvantageously.

SUMMARY OF THE INVENTION

The present invention has been made to solve the foregoing problem and aims at providing a connector and a connector assembly that enable an electrical connection of a contact to a conductor of a connection object regardless of whether the conductor is exposed on the front surface or the rear surface of the connection object.

A connector according to the present invention comprises:

a plug contact having conductivity and including a tubular portion extending along a fitting axis, and a flange extending from an end portion of the tubular portion in an orthogonal direction orthogonal to the fitting axis;

a bottom insulator having a support surface extending in the orthogonal direction or a direction inclined with respect to the orthogonal direction; and an inner contact having conductivity and being disposed on the support surface, wherein the inner contact includes a base portion of flat plate shape disposed on the support surface, and a first elastic portion and a second elastic portion that are joined to the base portion to face a rear surface of the flange and are elastically deformable in a direction along the fitting axis, and part of a connection object of sheet shape having a conductor exposed on at least one surface of the connection object is sandwiched between a first contacting part of the rear surface of the flange of the plug contact and the first elastic portion of the inner contact in the direction along the fitting axis, the first contacting part of the rear surface of the flange makes contact with a front surface of the connection object, the first elastic portion makes contact with the rear surface of the connection object, and a second contacting part of the rear surface of the flange makes contact with the second elastic portion, the second contacting part being different in position from the first contacting part, whereby the plug contact is electrically connected to the conductor directly when the conductor is exposed on the front surface of the connection object, and the plug contact is electrically connected to the conductor via the inner contact when the conductor is exposed on the rear surface of the connection object.

A connector assembly according to the present invention comprises:

a connection object; and the above-mentioned connector connected to the connection object, wherein the connection object includes a connection portion formed at a position corresponding to the first elastic portion of the inner contact, and an opening portion formed at a position corresponding to the second elastic portion of the inner contact, the connection portion of the connection object is sandwiched between the first contacting part of the rear surface of the flange and the first elastic portion of the inner contact as a part of the connection object, and the second contacting part of the rear surface of the flange makes contact with the second elastic portion of the inner contact via the opening portion.

DETAILED DESCRIPTION OF THE INVENTION

Embodiments of the present invention are described below based on the accompanying drawings.

Embodiment 1

Figure 1:
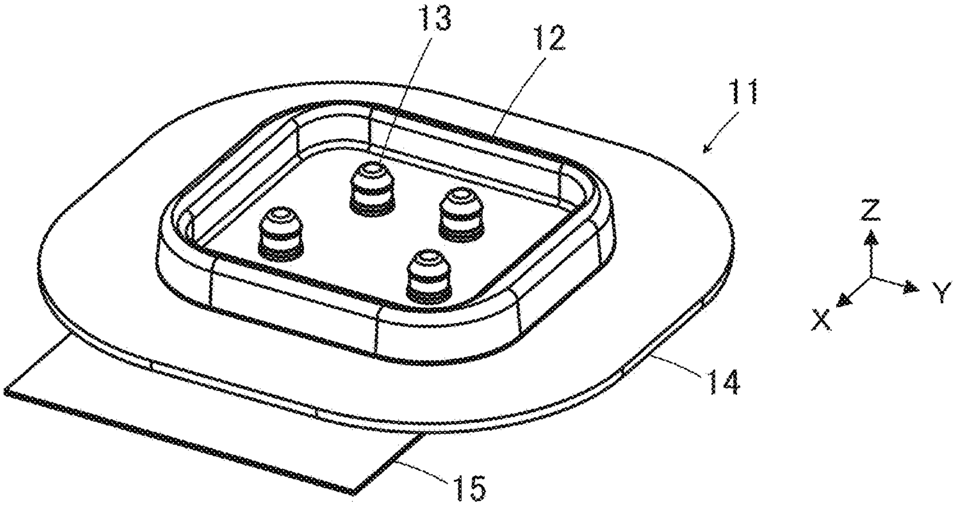
FIG. 1 is a perspective view showing a connector assembly according to Embodiment 1 when viewed from an obliquely upper position.

FIG. 1 shows a connector assembly according to Embodiment 1. The connector assembly includes a connector 11 used as, for instance, a garment-side connector for fitting a wearable device. The connector 11 has a housing 12 made of an insulating material. Four plug contacts 13 are retained in the housing 12, and a reinforcement sheet 14 and a sheet type conductive member 15 are superposed on each other and retained by the housing 12. The sheet type conductive member 15 constitutes a connection object to which the contact 11 is connected.

The four plug contacts 13 are arranged in two rows parallel to each other and disposed to project perpendicularly with respect to the sheet type conductive member 15.

For convenience, the reinforcement sheet 14 and the sheet type conductive member 15 are defined as extending along an XY plane, the arrangement direction of the four plug contacts 13 is referred to as "Y direction," and the direction in which the four plug contacts 13 project is referred to as "+Z direction." The Z direction is a fitting direction in which the connector 11 is fitted to a counter connector.

Figure 2:
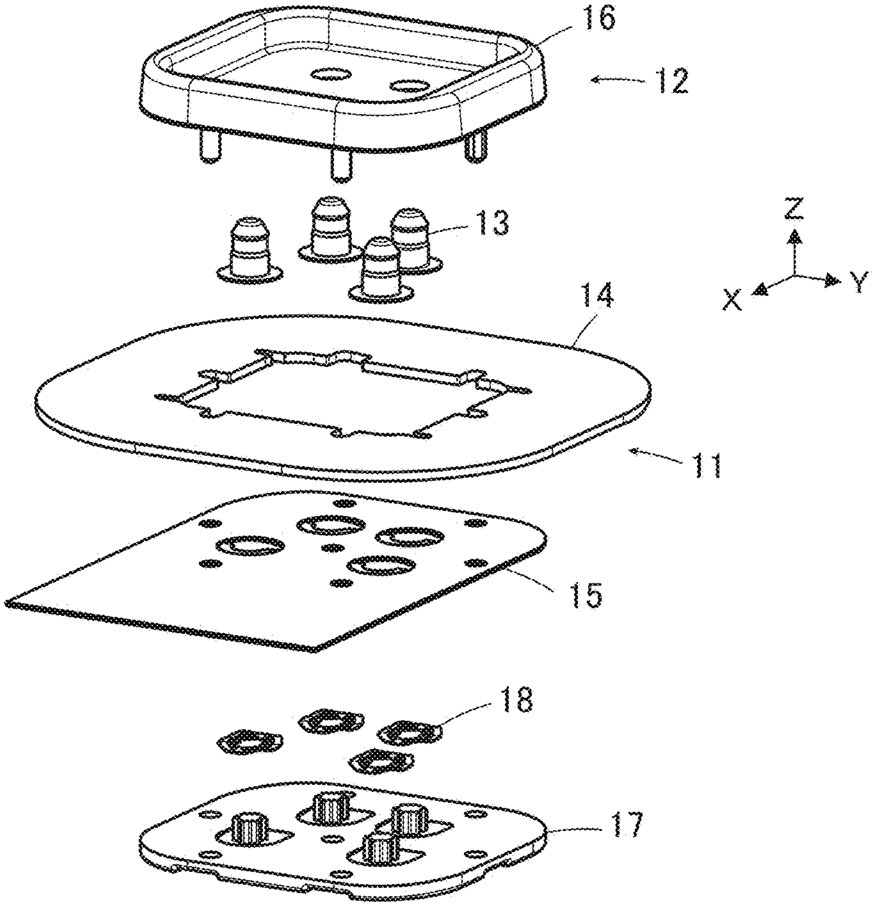
FIG. 2 is an assembly view of the connector assembly according to Embodiment 1.

FIG. 2 shows an assembly view of the connector assembly. The connector 11 includes a top insulator 16 and a bottom insulator 17, and these top and bottom insulators 16 and 17 constitute the housing 12.

The four plug contacts 13 are disposed on the −Z direction side of the top insulator 16, the reinforcement sheet 14 is disposed on the −Z direction side of the four plug contacts 13, and the sheet type conductive member 15 is disposed on the −Z direction side of the reinforcement sheet 14. Further, four inner contacts 18 are disposed on the −Z direction side of the sheet type conductive member 15, and the bottom insulator 17 is disposed on the −Z direction side of the four inner contacts 18. The four inner contacts 18 separately correspond to the four plug contacts 13.

Figure 3:
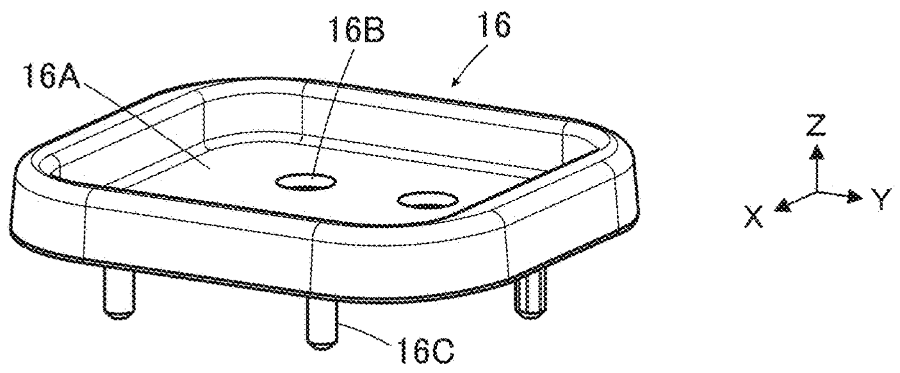
FIG. 3 is a perspective view showing a top insulator used in a connector of Embodiment 1.

As shown in FIG. 3, the top insulator 16 includes a recessed portion 16A opening in the +Z direction, and four contact through-holes 16B formed within the recessed portion 16A. The recessed portion 16A constitutes a counter connector accommodating portion in which part of a counter connector (not shown) is to be accommodated, and the four contact through-holes 16B separately correspond to the four plug contacts 13. In addition, on a surface, facing in the −Z direction, of the top insulator 16, a plurality of bosses 16C are formed to project in the −Z direction.

The four plug contacts 13 are each made of a conductive material such as metal, and are to be connected to corresponding contacts of a counter connector (not shown) when part of the counter connector is accommodated in the recessed portion 16A of the top insulator 16.

Figure 4:
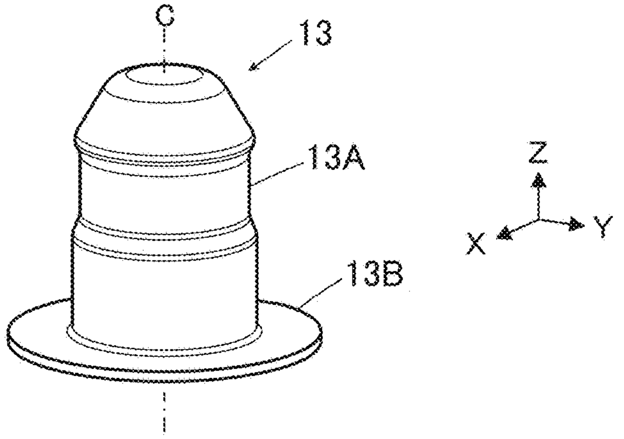
FIG. 4 is a perspective view showing a plug contact used in the connector of Embodiment 1.

As shown in FIG. 4, the plug contact 13 has a tubular portion 13A of cylindrical shape extending along a fitting axis C in the Z direction, and a flange 13B extending from a −Z directional end portion of the tubular portion 13A along an XY plane.

Figure 5:
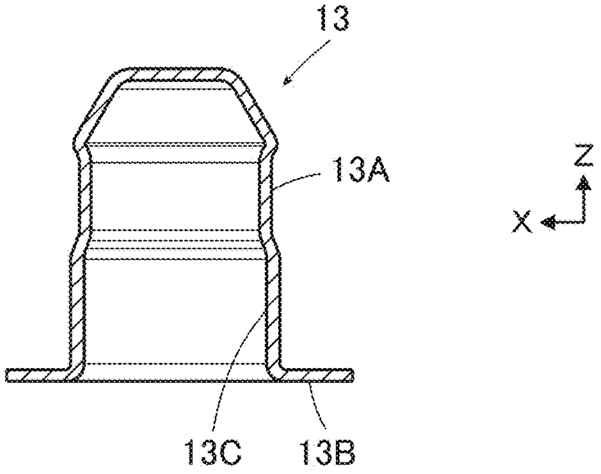
FIG. 5 is a cross-sectional view showing the plug contact used in the connector of Embodiment 1.

As shown in FIG. 5, the tubular portion 13A is provided in its interior with a recessed portion 13C opening in the −Z direction.

It should be noted that the fitting axis C is an axis passing the center of the tubular portion 13A and extending in the fitting direction between the connector 11 and a counter connector.

While the tubular portion 13A has a cylindrical shape, the cross-sectional shape thereof is not limited to a circular shape, and the tubular portion 13A may have various cross-sectional shapes such as an elliptical shape and a polygonal shape as long as the tubular portion 13A is provided in its interior with the recessed portion 13C.

All the four plug contacts 13 may be each used as a terminal for transmitting an electric signal.

Figure 6:
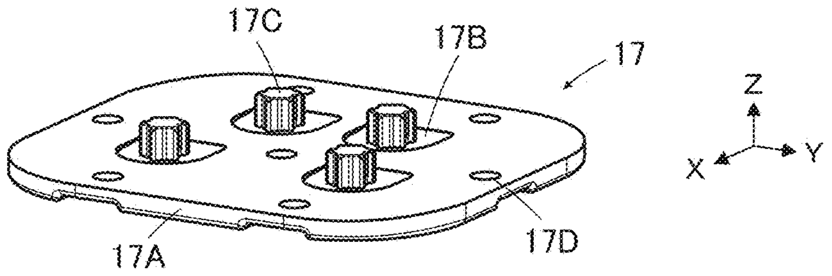
FIG. 6 is a perspective view showing a bottom insulator used in the connector of Embodiment 1.

As shown in FIG. 6, the bottom insulator 17 includes a flat plate portion 17A, and the flat plate portion 17A is provided with four inner contact accommodating portions 17B of recess shape opening in the +Z direction. The four inner contact accommodating portions 17B separately correspond to the four plug contacts 13. The four inner contact accommodating portions 17B are separately provided with four protrusion portions 17C projecting in the +Z direction from respective centers of the inner contact accommodating portions 17B.

In addition, the flat plate portion 17A is provided with a plurality of through-holes 17D separately corresponding to the plurality of bosses 16C of the top insulator 16.

Figure 7:
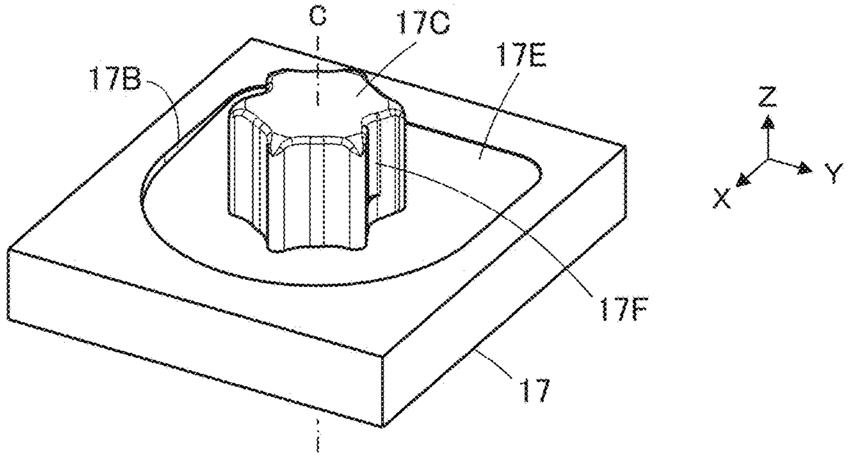
FIG. 7 is a perspective view showing a protrusion portion of the bottom insulator used in the connector of Embodiment 1.

As shown in FIG. 7, the bottom surface of the inner contact accommodating portion 17B of the bottom insulator 17 forms a flat support surface 17E facing in the +Z direction. The support surface 17E is constituted of an inclined surface inclining in the −Z direction as advancing in the +X direction. The support surface 17E is inclined such that a height difference corresponding to the thickness of the sheet type conductive member 15 occurs between a part, situated on the +X direction side from the protrusion portion 17C, of the support surface 17E and a part, situated on the −X direction side from the protrusion portion 17C, of the support surface 17E.

Figure 8:
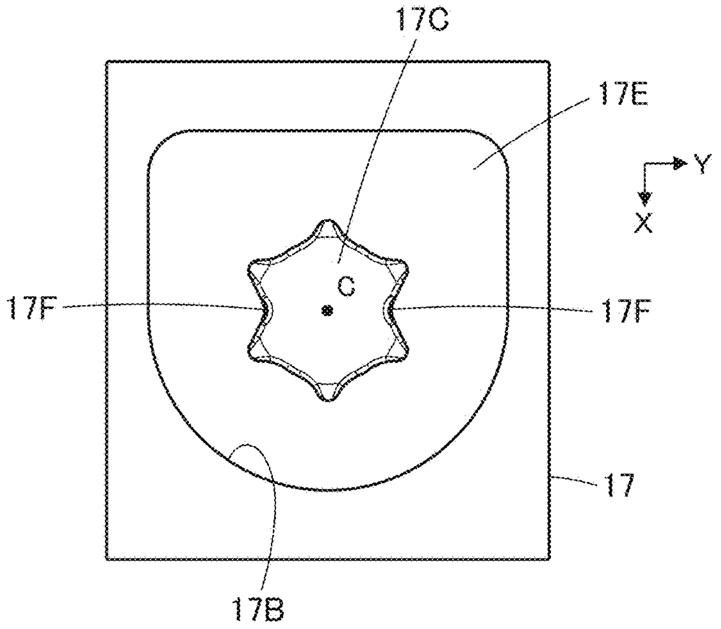
FIG. 8 is a plan view showing the protrusion portion of the bottom insulator used in the connector of Embodiment 1.

The protrusion portion 17C projects from the support surface 17E in the +Z direction along the fitting axis C and has a prismatic shape having a substantially hexagonal cross section as shown in FIG. 8. The protrusion portion 17C has a maximum diameter slightly larger than an inside diameter of the recessed portion 13C of the tubular portion 13A of the plug contact 13. In addition, projection accommodating portions 17F of recess shape are separately formed in lateral surfaces, facing in the +Y direction and the +Y direction, of the protrusion portion 17C. Each of the projection accommodating portions 17F extends in the −Z direction from a +Z directional end portion of the protrusion portion 17C toward a root portion of the protrusion portion 17C but does not reach the support surface 17E and terminates at a position on the +Z direction side apart from the support surface 17E by a predetermined distance.

Figure 9:
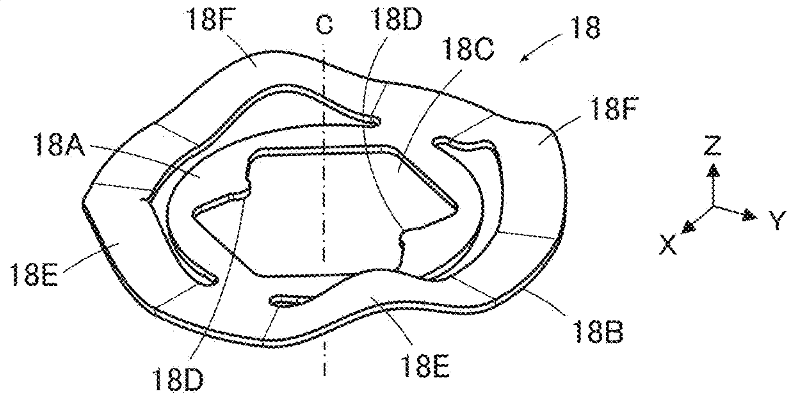
FIG. 9 is a perspective view showing an inner contact used in the connector of Embodiment 1.
Figure 10:
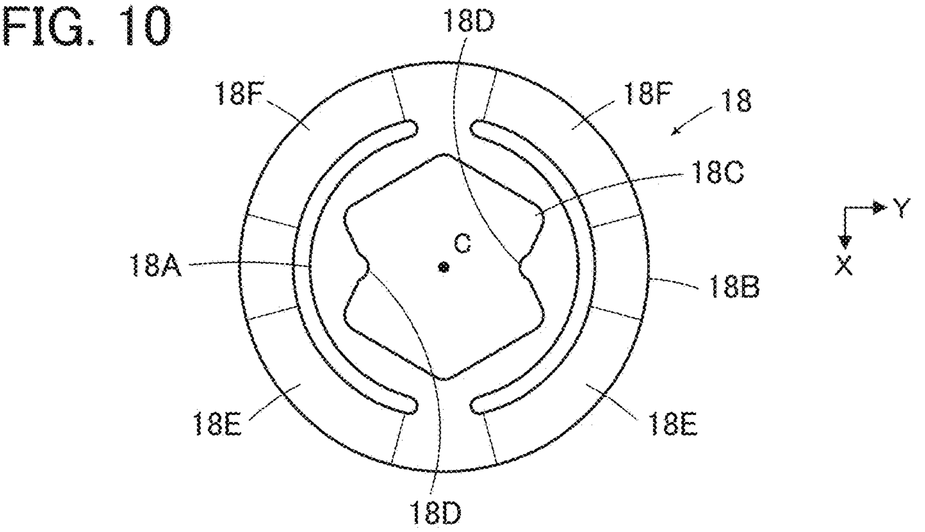
FIG. 10 is a plan view showing the inner contact used in the connector of Embodiment 1.
Figure 11:
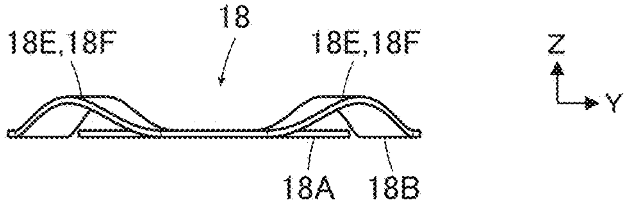
FIG. 11 is a front view showing the inner contact used in the connector of Embodiment 1.

As shown in FIGS. 9 to 11, the inner contact 18 is formed of a single metal sheet having conductivity and being bent, and has a base portion 18A of flat plate shape extending along an XY plane, and an annular portion 18B joined to a +X directional end portion and a −X directional end portion of the base portion 18A and annularly extending along an outer periphery of the base portion 18A so as to surround the base portion 18A.

The base portion 18A has a through-hole 18C through which the fitting axis C passes and in which the protrusion portion 17C of the bottom insulator 17 is to be inserted, and a pair of projections 18D formed to separately project from +Y and −Y directional edge portions of the through-hole 18C toward the fitting axis C.

The annular portion 18B is curved along the outer periphery of the base portion 18A so as to wave in the Z direction and is provided, at its separate rotational positions different from one another about the fitting axis C, with a pair of first elastic portions 18E and a pair of second elastic portions 18F, the first elastic portions 18E and the second elastic portions 18F being curved so as to protrude in the +Z direction with respect to the base portion 18A and being elastically deformable in the Z direction. These first elastic portions 18E and second elastic portions 18F each have a double-sided beam shape that forms part of the annular portion 18B and are disposed at 90-degree intervals about the fitting axis C. In addition, the pair of first elastic portions 18E are separately disposed at +X directional parts of the annular portion 18B, while the pair of second elastic portions 18F are separately disposed at −X directional parts of the annular portion 18B so as to face the pair of first elastic portions 18E across the fitting axis C.

The sheet type conductive member 15 has a multilayer structure in which a plurality of wiring layers each formed from a conductor and a plurality of insulating layers are laminated.

Figure 12:
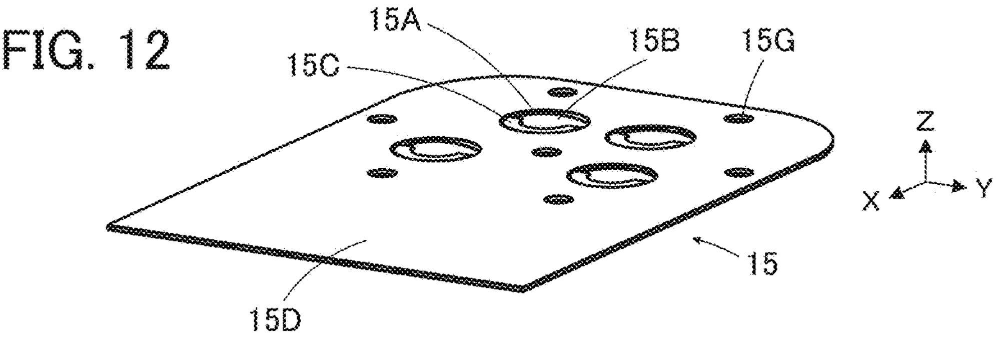
FIG. 12 is a perspective view showing a connection object to be connected to the connector of Embodiment 1 when viewed from an obliquely upper position.

As shown in FIG. 12, four circular contact arrangement regions 15A for separately arranging the four plug contacts 13 are defined on a front surface, facing in the +Z direction, of the sheet type conductive member 15. At each of the contact arrangement regions 15A, an opening portion 15B is formed to penetrate the sheet type conductive member 15 in the Z direction, and a wiring layer 15C is exposed toward the +Z direction so as to be adjacent to the opening portion 15B on the +X direction side thereof. In a remaining region excluding the four contact arrangement regions 15A, the insulating layer 15D is exposed.

Figure 13:
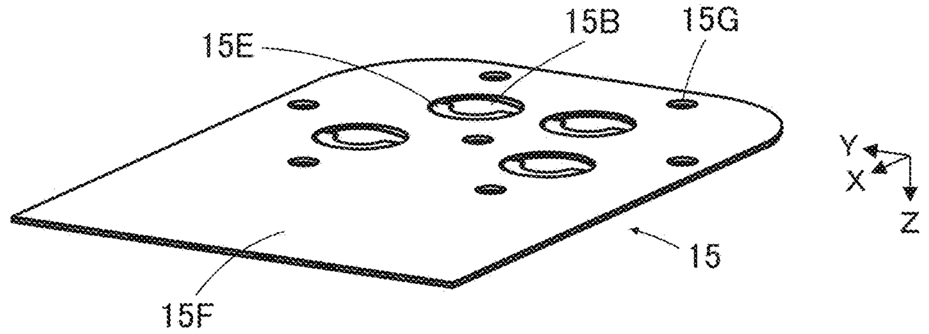
FIG. 13 is a perspective view showing the connection object to be connected to the connector of Embodiment 1 when viewed from an obliquely lower position.

Since the opening portions 15B penetrate the sheet type conductive member 15 in the Z direction, as shown in FIG. 13, the opening portions 15B can be seen also on a rear surface, facing in the −Z direction, of the sheet type conductive member 15 at positions corresponding to the four contact arrangement regions 15A.

On the rear surface, facing in the −Z direction, of the sheet type conductive member 15, a wiring layer 15E is exposed toward the −Z direction so as to be adjacent to each of the opening portions 15B the +X direction side thereof, the opening portions 15B being formed at the positions corresponding to the four contact arrangement regions 15A, and in a remaining region excluding the opening portions 15B, an insulating layer 15F is exposed.

A plurality of through-holes 15G separately corresponding to the plurality of bosses 16C of the top insulator 16 are formed at a peripheral portion of the sheet type conductive member 15.

Figure 14:
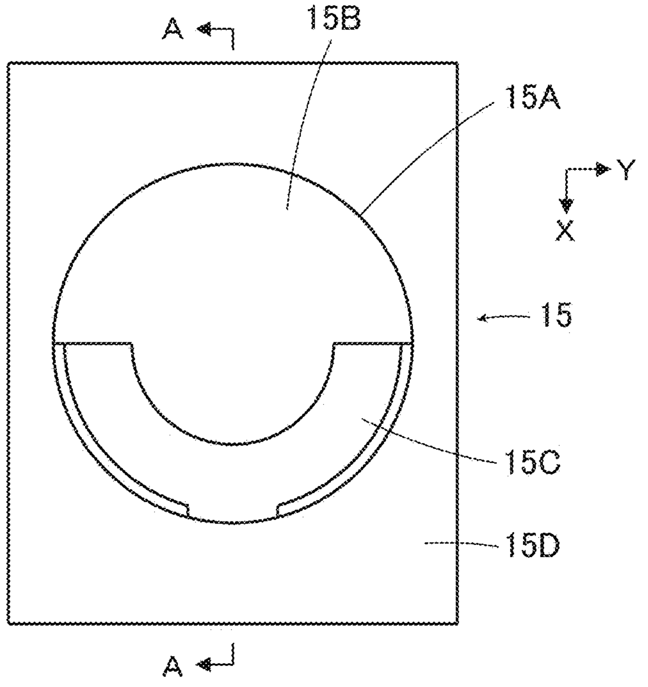
FIG. 14 is a partial plan view showing the connection object to be connected to the connector of Embodiment 1.

As shown in FIG. 14, in the circular contact arrangement region 15A, a region of the wiring layer 15C is exposed toward the +Z direction, the region extending in a U shape with a predetermined width along an inner side of a contour of a semicircular portion on the +X direction side of the contact arrangement region 15A. In a remaining region of the contact arrangement region 15A excluding the region where the wiring layer 15C is exposed, the opening portion 15B is formed.

As with the wiring layer 15C, on the rear surface, facing in the −Z direction, of the sheet type conductive member 15, a region of the wiring layer 15E is exposed toward the −Z direction, the region extending in a U shape with a predetermined width along the inner side of the contour of the semicircular portion on the +X direction side of the contact arrangement region 15A.

Figure 15:
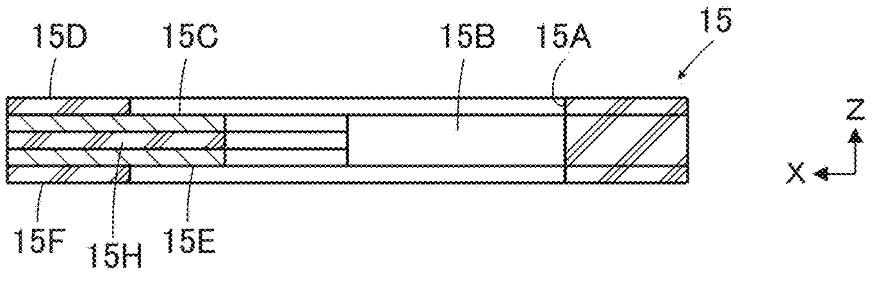
FIG. 15 is a cross-sectional view taken along line A-A in FIG. 14.

As shown in FIG. 15, the wiring layer 15C exposed toward the +Z direction and the wiring layer 15E exposed toward the −Z direction are laminated via the insulating layer 15H.

Figure 16:
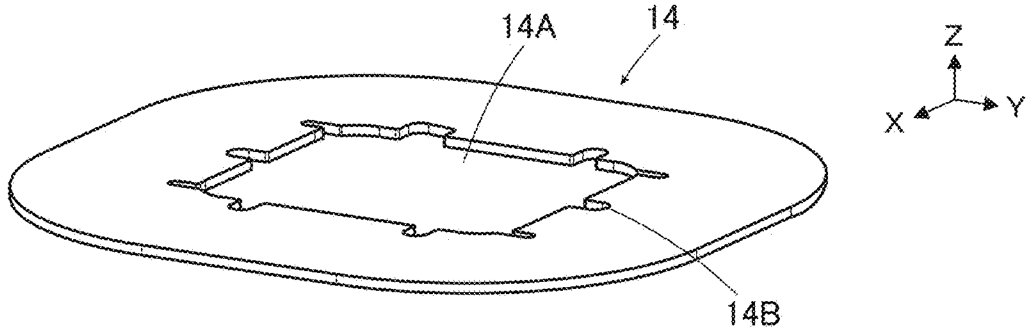
FIG. 16 is a perspective view showing a reinforcement sheet used in the connector of Embodiment 1.

As shown in FIG. 16, the reinforcement sheet 14 is provided to reinforce a mounting object (not shown) such as a garment on which the connector 11 is to be mounted. The reinforcement sheet 14 is made of an insulating material and provided at its center with an opening 14A. Further, a plurality of cutouts 14B separately corresponding to the plurality of bosses 16C of the top insulator 16 are formed along the periphery of the opening portion 14A of the reinforcement sheet 14.

The four contact through-holes 16B of the top insulator 16, the four plug contacts 13, the four contact arrangement regions 15A of the sheet type conductive member 15, the four inner contacts 18, and the four inner contact accommodating portions 17B of the bottom insulator 17 are arranged so as to align with each other in the Z direction.

In addition, the bosses 16C of the top insulator 16, the cutouts 14B of the reinforcement sheet 14, the through-holes 15G of the sheet type conductive member 15, and the through-holes 17D of the bottom insulator 17 are arranged so as to align with each other in the Z direction.

Figure 17:
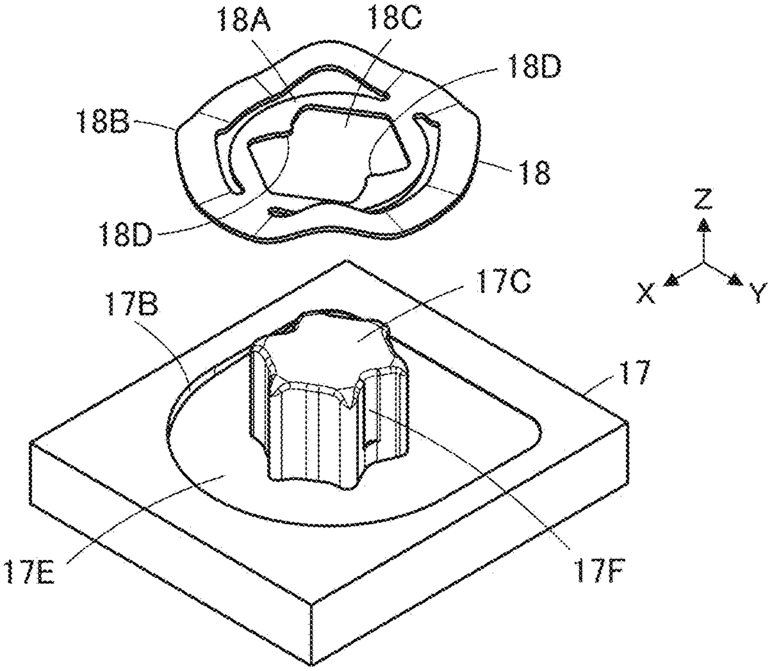
FIG. 17 is a perspective view showing a state where the inner contact is positionally aligned with the bottom insulator in Embodiment 1.
Figure 18:
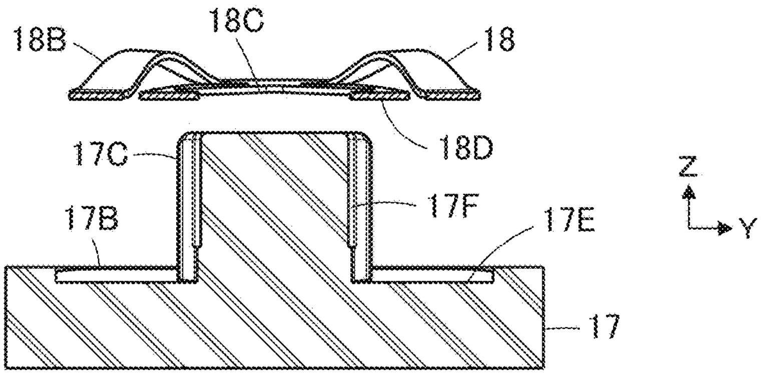
FIG. 18 is a cross-sectional front view showing the state where the inner contact is positionally aligned with the bottom insulator in Embodiment 1.

When the connector 11 is assembled, first, as shown in FIGS. 17 and 18, the inner contact 18 is positionally aligned with the corresponding inner contact accommodating portion 17B of the bottom insulator 17 on the −Z direction side thereof. At this time, the base portion 18A and the annular portion 18B of the inner contact 18 are situated on the +Z direction side of the corresponding inner contact accommodating portion 17B of the bottom insulator 17, and the through-hole 18C formed in the base portion 18A is situated on the +Z direction side of the protrusion portion 17C projecting from the inner contact accommodating portion 17B.

Next, the inner contact 18 is pushed in the −Z direction toward the bottom insulator 17 while the protrusion portion 17C of the bottom insulator 17 is inserted into the through-hole 18C of the inner contact 18. At this time, the inner contact 18 is pushed, having the pair of projections 18D projecting in the through-hole 18C of the inner contact 18 separately inserted in the pair of projection accommodating portions 17F of the protrusion portion 17C of the bottom insulator 17.

Figure 19:
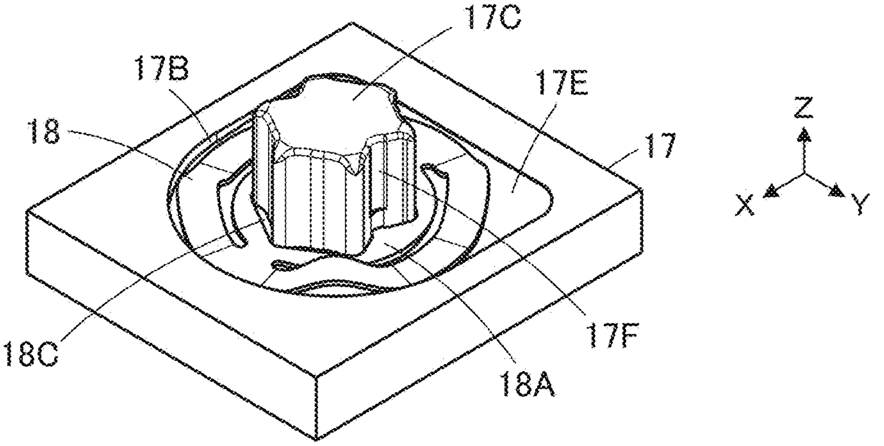
FIG. 19 is a perspective view showing a state where the inner contact is disposed on the bottom insulator in Embodiment 1.
Figure 20:
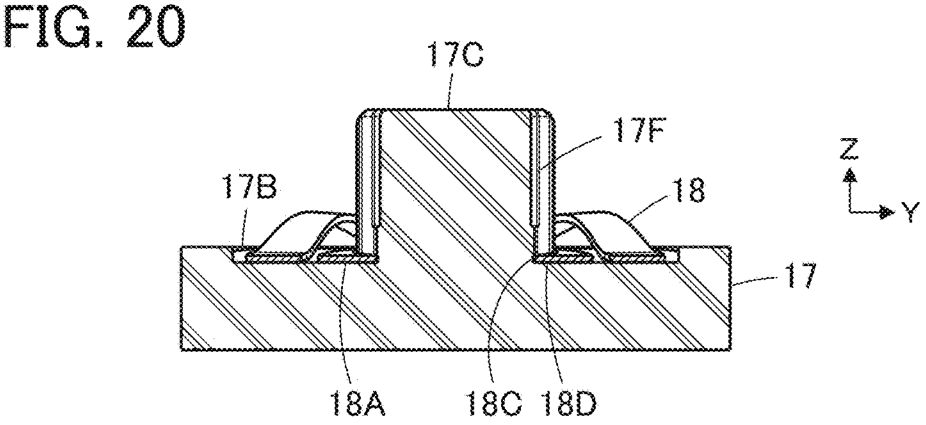
FIG. 20 is a cross-sectional front view showing the state where the inner contact is disposed on the bottom insulator in Embodiment 1.

Since each of the projection accommodating portions 17F of the protrusion portion 17C of the bottom insulator 17 does not reach the support surface 17E of the inner contact accommodating portion 17B and terminates at the position on the +Z direction side apart from the support surface 17E by the predetermined distance, when the inner contact 18 is pushed to the bottom insulator 17 until the base portion 18A of the inner contact 18 makes contact with the support surface 17E, the protrusion portion 17C of the bottom insulator 17 is press-fitted into the through-hole 18C of the inner contact 18 as shown in FIGS. 19 and 20. Thus, the inner contact 18 is accommodated in the inner contact accommodating portion 17B and fixed to the bottom insulator 17.

Figure 21:
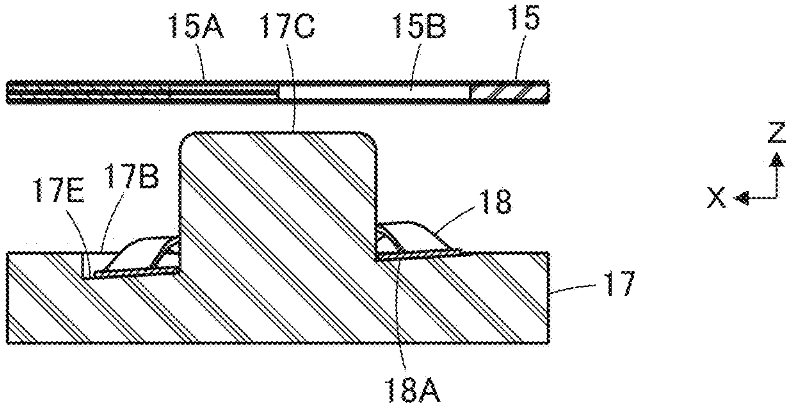
FIG. 21 is a cross-sectional side view showing a state where the connection object is positionally aligned with the bottom insulator in Embodiment 1.

Further, the sheet type conductive member 15 is positionally aligned with the bottom insulator 17 on the +Z direction side of the bottom insulator 17 as shown in FIG. 21. At this time, the contact arrangement region 15A and the opening portion 15B of the sheet type conductive member 15 are situated on the +Z direction side of the corresponding inner contact accommodating portion 17B of the bottom insulator 17.

The support surface 17E of the inner contact accommodating portion 17B of the bottom insulator 17 is inclined in the −Z direction as advancing in the +X direction, and the inner contact 18 in which the base portion 18A makes contact with the support surface 17E is also inclined with respect to an XY plane as with the support surface 17E and is retained by the inner contact accommodating portion 17B.

Figure 22:
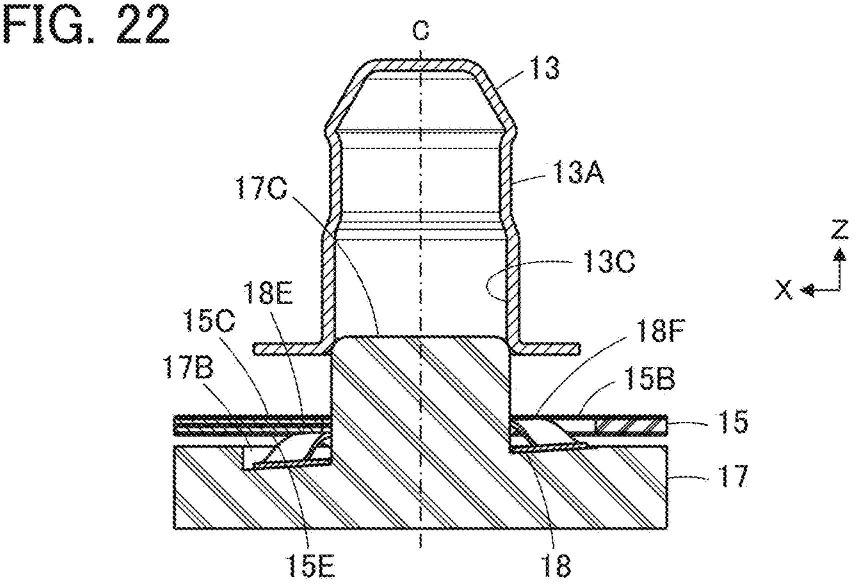
FIG. 22 is a cross-sectional side view showing a press-fitting start state of the protrusion portion of the bottom insulator with respect to the plug contact in Embodiment 1.

When the sheet type conductive member 15 is moved toward the bottom insulator 17 relatively in the −Z direction, the protrusion portion 17C of the bottom insulator 17 is inserted into the opening portion 15B of the sheet type conductive member 15 as shown in FIG. 22.

Here, the wiring layers 15C and 15E of the sheet type conductive member 15 are respectively exposed toward the +Z direction and the −Z direction on the +X direction side of the opening portion 15B. Therefore, in the inner contact 18 retained by the inner contact accommodating portion 17B of the bottom insulator 17, the pair of first elastic portions 18E disposed on the +X direction side of the fitting axis C are situated on the −Z direction side of the exposed part of the wiring layer 15E of the sheet type conductive member 15, while the pair of second elastic portions 18F disposed on the −X direction side of the fitting axis C are exposed toward the +Z direction via the opening portion 15B of the sheet type conductive member 15.

Further, the corresponding plug contact 13 is positionally aligned with the +Z direction side of the inner contact accommodating portion 17B of the bottom insulator 17. At this time, the recessed portion 13C of the tubular portion 13A of the plug contact 13 is situated on the +Z direction side of the protrusion portion 17C of the bottom insulator 17.

Figure 23:
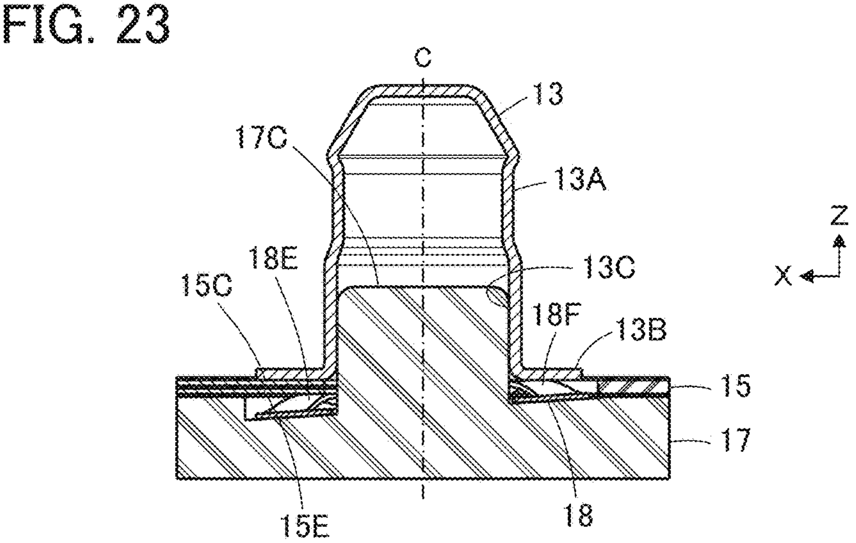
FIG. 23 is a cross-sectional side view showing a press-fitting completion state of the protrusion portion of the bottom insulator with respect to the plug contact in Embodiment 1.

Next, the plug contact 13 is pushed toward the bottom insulator 17 relatively in the −Z direction, and the protrusion portion 17C of the bottom insulator 17 is press-fitted into the recessed portion 13C of the tubular portion 13A of the plug contact 13 as shown in FIG. 23.

As a result, on the +X direction side of the fitting axis C, the pair of first elastic portions 18E of the inner contact 18 are pushed in the −Z direction and elastically deformed by the flange 13B of the plug contact 13 via the sheet type conductive member 15, and on the −X direction side of the fitting axis C, the pair of second elastic portions 18F of the inner contact 18 are pushed in the −Z direction and elastically deformed directly by the flange 13B of the plug contact 13.

Figure 24:
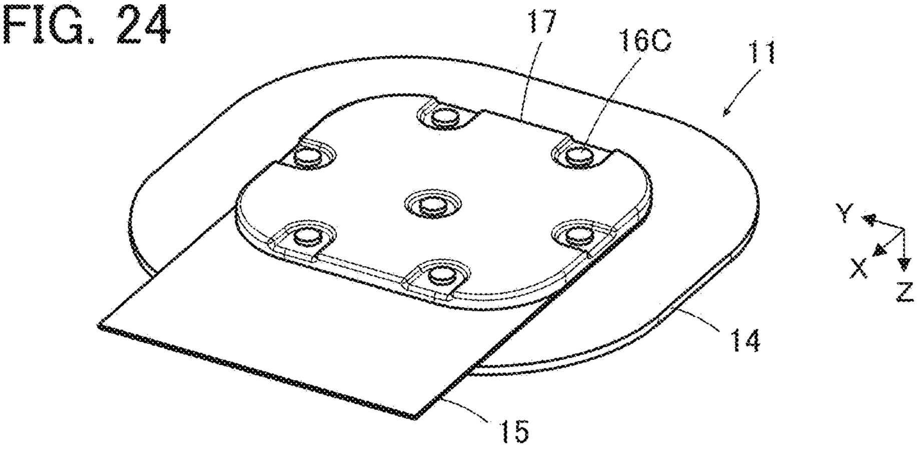
FIG. 24 is a perspective view showing the connector assembly of Embodiment 1 when viewed from an obliquely lower position.

In addition, by pressing the bottom insulator 17 against the top insulator 16, the bosses 16C of the top insulator 16 sequentially penetrate the cutouts 14B of the reinforcement sheet 14, the through-holes 15G of the sheet type conductive member 15, and the through-holes 17D of the bottom insulator 17. Thereafter, as shown in FIG. 24, the top insulator 16 and the bottom insulator 17 are fixed to each other through heat deformation of a tip of each of the plurality of bosses 16C projecting on the −Z direction side of the bottom insulator 17. Thus, the assembling operation of the connector 11 connected to the sheet type conductive member 15 is completed.

Figure 25:
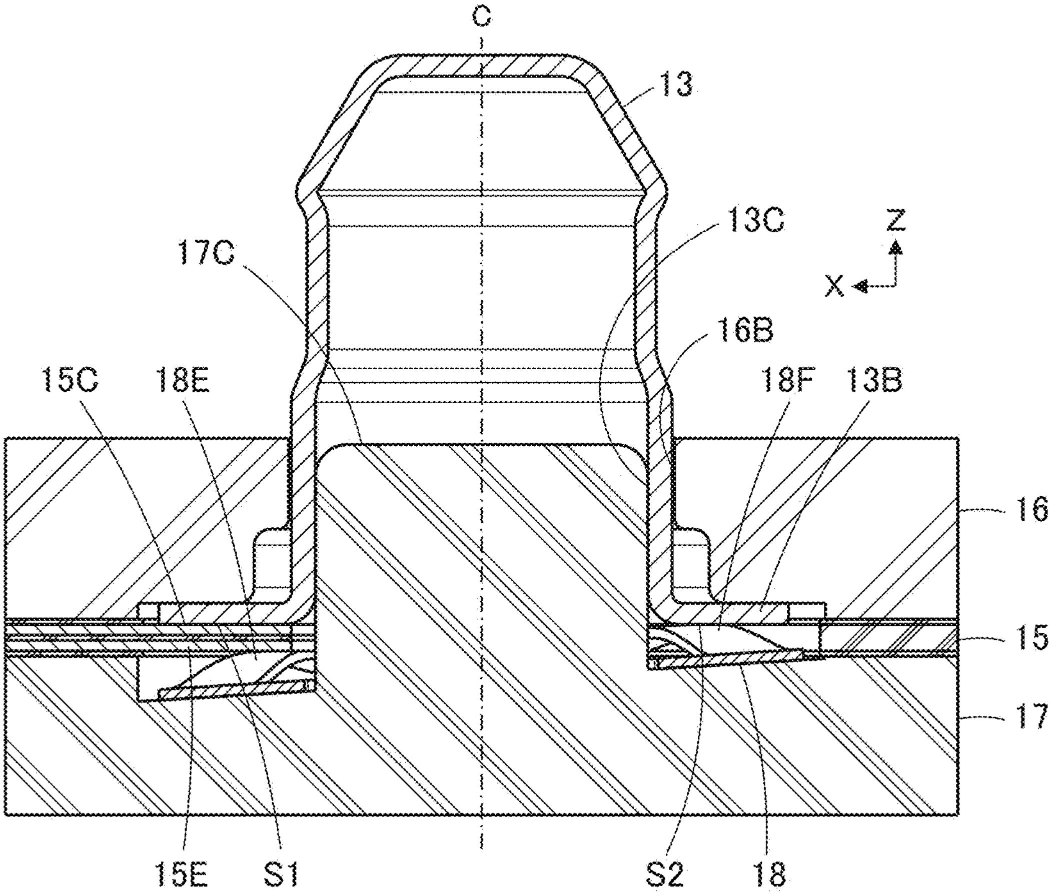
FIG. 25 is a partial cross-sectional view showing the connector assembly of Embodiment 1.

In the thus-assembled connector 11, as shown in FIG. 25, on the +X direction side of the fitting axis C, the sheet type conductive member 15 is sandwiched between the flange 13B of the plug contact 13 and the pair of first elastic portions 18E of the inner contact 18.

Thus, a first contacting part S1 formed of part of a −Z directional surface of the flange 13B of the plug contact 13 makes contact with the wiring layer 15C of the sheet type conductive member 15 with predetermined contact pressure, and the plug contact 13 is electrically connected with the wiring layer 15C. In addition, +Z directional surfaces of the pair of first elastic portions 18E of the inner contact 18 make contact with the wiring layer 15E of the sheet type conductive member 15 with predetermined contact pressure, and the inner contact 18 is electrically connected to the wiring layer 15E.

On the other hand, on the −X direction side of the fitting axis C, a second contacting part S2 formed of part, at a different position from the first contacting part S1, of the −Z directional surface of the flange 13B of the plug contact 13 makes direct contact with the pair of second elastic portions 18F of the inner contact 18 with predetermined contact pressure, and the plug contact 13 is electrically connected to the inner contact 18.

Therefore, the wiring layer 15C exposed on the front surface of the sheet type conductive member 15 is electrically connected to the plug contact 13 directly, while the wiring layer 15E exposed on the rear surface of the sheet type conductive member 15 is electrically connected to the plug contact 13 via the inner contact 18. That is, both the wiring layers 15C and 15E are connected to the plug contact 13.

Thus, with the connector 11, by using the inner contact 18, both the wiring layer 15C and the wiring layer 15E respectively formed of the conductors disposed on the front surface side and the rear surface side of the sheet type conductive member 15 can be electrically connected to the single plug contact 13.

Therefore, when the connector 11 is connected to a sheet type conductive member having a conductor exposed only on its front surface side, the plug contact 13 can be electrically connected to the conductor on the front surface side of the sheet type conductive member. On the other hand, when the connector 11 is connected to a sheet type conductive member having a conductor exposed only on its rear surface side, the plug contact 13 can be electrically connected to the conductor on the rear surface side of the sheet type conductive member.

Further, when the connector 11 is connected to a sheet type conductive member having conductors separately exposed on its front surface side and rear surface side like the sheet type conductive member 15 in Embodiment 1 above, the plug contact 13 can be electrically connected to both the conductors on the front surface side and the rear surface side of the sheet type conductive member. For example, assuming that a connection object is a sheet type conductive member having a multilayer structure in which conductors constituting shield layers are separately exposed on the front surface side and the rear surface side and a conductor constituting a signal wiring layer is disposed between these shield layers so as to be insulated from both the shield layers, a shield effect is exhibited to the signal wiring layer when the plug contact 13 connected to the shield layers on the front surface side and the rear surface side is connected to a ground potential, and it is possible to carry out highly accurate signal transmission with reduced influence of external disturbances caused by, for example, electromagnetic waves.

In Embodiment 1 described above, the protrusion portion 17C of the bottom insulator 17 is press-fitted into the recessed portion 13C of the tubular portion 13A of the plug contact 13, whereby the plug contact 13 is retained by the bottom insulator 17. As a result, the pair of first elastic portions 18E and the pair of second elastic portions 18F of the inner contact 18 are maintained in an elastically deformed state, and contact pressure between the wiring layer 15C of the sheet type conductive member 15 and the flange 13B of the plug contact 13, contact pressure between the wiring layer 15E of the sheet type conductive member 15 and the pair of first elastic portions 18E of the inner contact 13, and contact pressure between the flange 13B of the plug contact 13 and the pair of second elastic portions 18F of the inner contact 18 are ensured.

However, also by fixing the top insulator 16 to the bottom insulator 17 using the plurality of bosses 16C of the top insulator 16, the flange 13B of the plug contact 13 is pressed toward the bottom insulator 17 by means of the top insulator 16, whereby the plug contact 13 can be fixed to the bottom insulator 17.

Meanwhile, compared to the configuration of fixation with use of the plurality of bosses 16C of the top insulator 16, in the configuration in which the protrusion portion 17C of the bottom insulator 17 is press-fitted into the recessed portion 13C of the tubular portion 13A of the plug contact 13 as in Embodiment 1, the plug contact 13 can be forcibly fixed to the bottom insulator 17 at a position closer to a contact portion between the wiring layer 15C of the sheet type conductive member 15 and the flange 13B of the plug contact 13, a contact portion between the wiring layer 15E of the sheet type conductive member 15 and the pair of first elastic portions 18E of the inner contact 18, and a contact portion between the flange 13B of the plug contact 13 and the pair of second elastic portions 18F of the inner contact 18, so that reliability of the electric connection between the sheet type conductive member 15 and the plug contact 13 can be improved.

While the inner contact 18 has the pair of first elastic portions 18E and the pair of second elastic portions 18F in Embodiment 1 described above, the invention is not limited thereto, and the inner contact 18 may have a single first elastic portion 18E and a single second elastic portion 18F or three or more first elastic portions 18E and three or more second elastic portions 18F.

Embodiment 2

Figure 26:
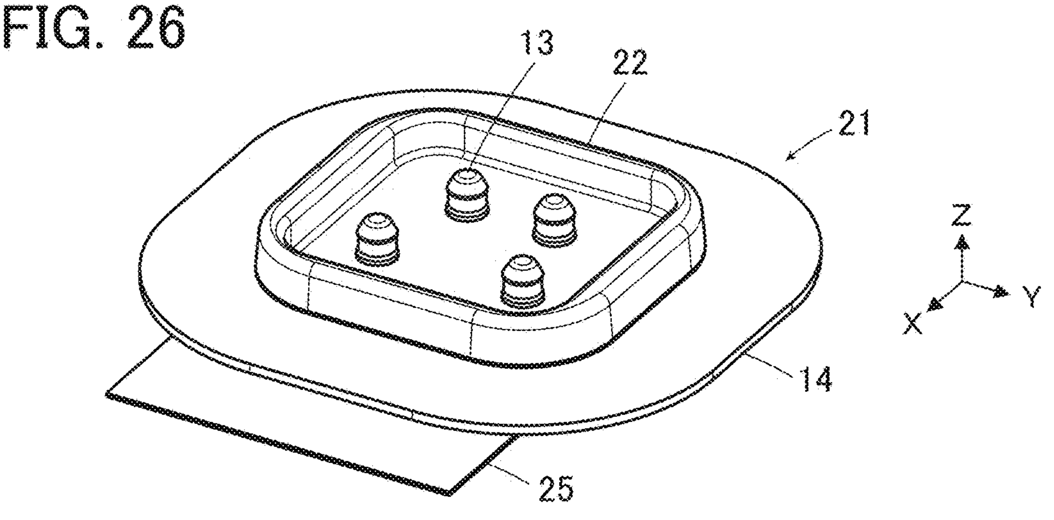
FIG. 26 is a perspective view showing a connector assembly according to Embodiment 2 when viewed from an obliquely upper position.

FIG. 26 shows a connector assembly according to Embodiment 2. The connector assembly is obtained by connecting a connector 21 to a sheet type conductive member 25 as a connection object. The connector 21 has a housing 22 instead of the housing 12 in the connector 11 of Embodiment 1.

Figure 27:
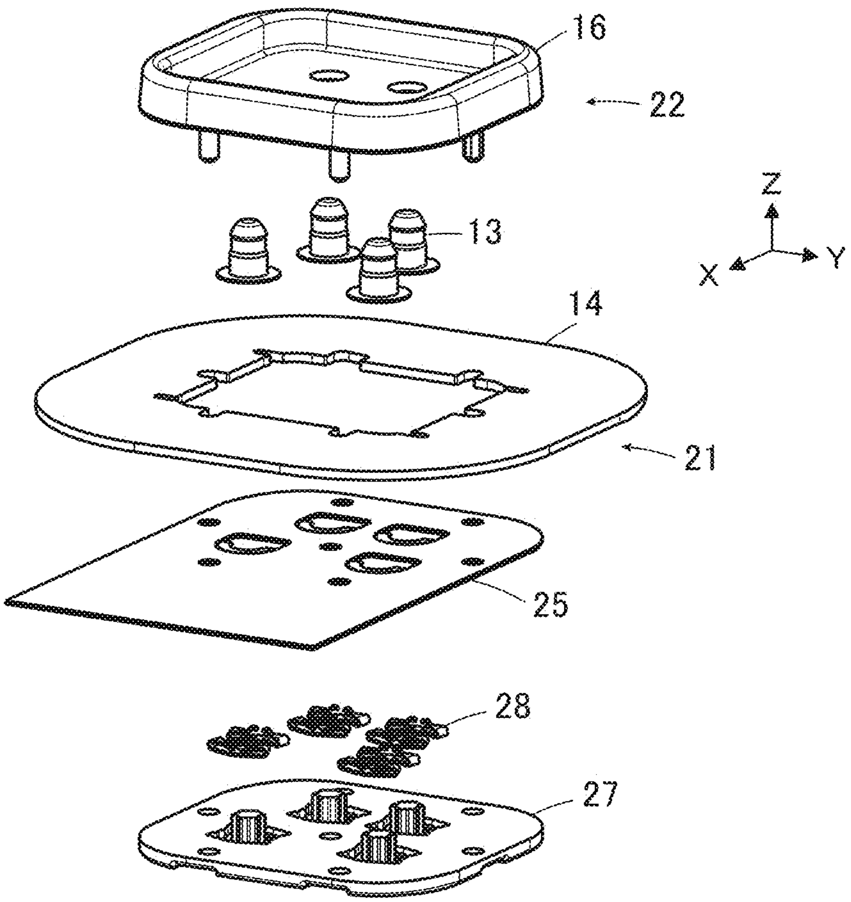
FIG. 27 is an assembly view of the connector assembly according to Embodiment 2.

FIG. 27 shows an assembly view of the connector assembly. The connector 21 includes the top insulator 16 and a bottom insulator 27, and these top and bottom insulators 16 and 27 constitute the housing 22.

The four plug contacts 13 are disposed on the −z direction side of the top insulator 16, the reinforcement sheet 14 is disposed on the −Z direction side of the four plug contacts 13, and the sheet type conductive member 25 is disposed on the −Z direction side of the reinforcement sheet 14. Further, four inner contacts 28 are disposed on the −Z direction side of the sheet type conductive member 25, and the bottom insulator 27 is disposed on the −Z direction side of the four inner contacts 28.

In other words, the connector 21 according to Embodiment 2 is configured to be connected to the sheet type conductive member 25 by means of the bottom insulator 27 and the four inner contacts 28 in place of the bottom insulator 17 and the four inner contacts 18 in the connector 11 according to Embodiment 1.

The top insulator 16, the plug contacts 13 and the reinforcement sheet 14 are the same as those used in Embodiment 1.

Figure 28:
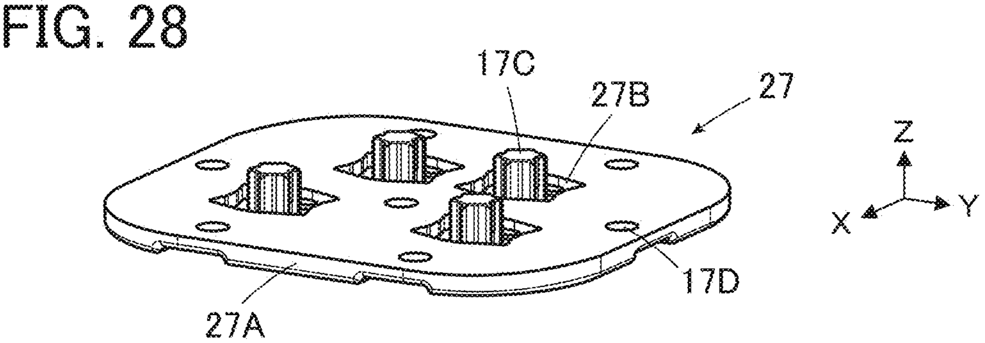
FIG. 28 is a perspective view showing a bottom insulator used in a connector of Embodiment 2.

As shown in FIG. 28, the bottom insulator 27 includes a flat plate portion 27A, and the flat plate portion 27A is provided with four inner contact accommodating portions 27B of recess shape opening in the +Z direction. The four inner contact accommodating portions 27B separately correspond to the four plug contacts 13.

As with the bottom insulator 17 in Embodiment 1, the four inner contact accommodating portions 27B are separately provided with the four protrusion portions 17C projecting in the +Z direction from the respective centers of the inner contact accommodating portions 27B, and the flat plate portion 27A is provided with the plurality of through-holes 17D corresponding to the plurality of bosses 16C of the top insulator 16.

Figure 29:
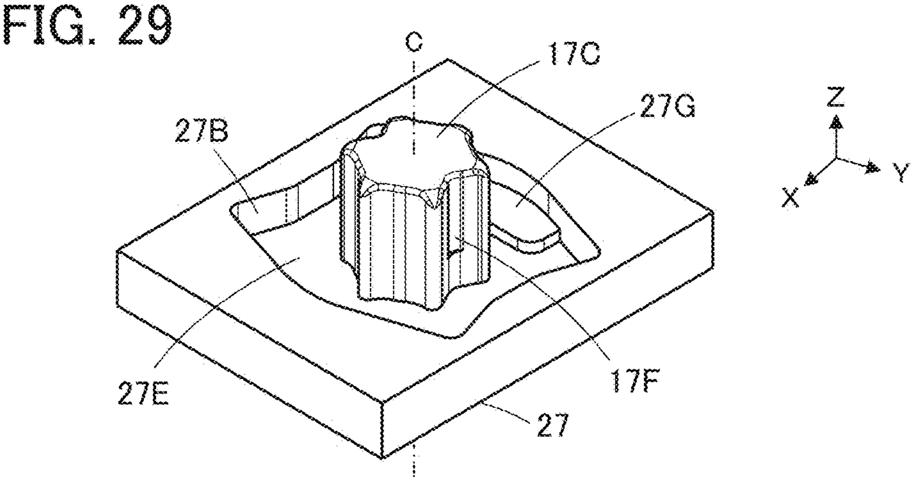
FIG. 29 is a perspective view showing a protrusion portion of the bottom insulator used in the connector of Embodiment 2.

As shown in FIG. 29, the bottom surface of the inner contact accommodating portion 27B of the bottom insulator 27 forms a flat support surface 27E extending along an XY plane and facing in the +Z direction. A −X directional end portion of the inner contact accommodating portion 27B is provided with a step portion 27G that is adjacent to the support surface 27E and situated on the +Z direction side away from the support surface 27E by the height corresponding to the thickness of the sheet type conductive member 25.

Figure 30:
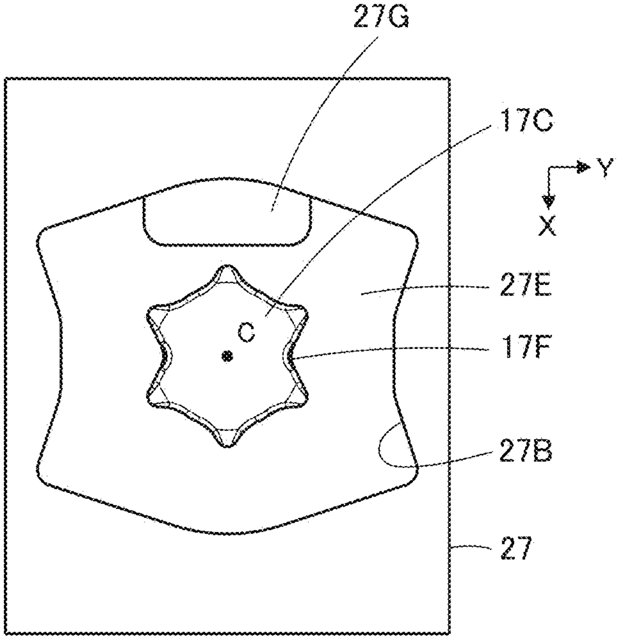
FIG. 30 is a plan view showing the protrusion portion of the bottom insulator used in the connector of Embodiment 2.

As with the protrusion portion 17C of the bottom insulator 17 in Embodiment 1, the protrusion portion 17C projects from the support surface 27E in the +Z direction along the fitting axis C, and has a prismatic shape having a substantially hexagonal cross section as shown in FIG. 30. In addition, the projection accommodating portions 17F of recess shape are separately formed in lateral surfaces, facing in the +Y direction and the −Y direction, of the protrusion portion 17C.

Figure 31:
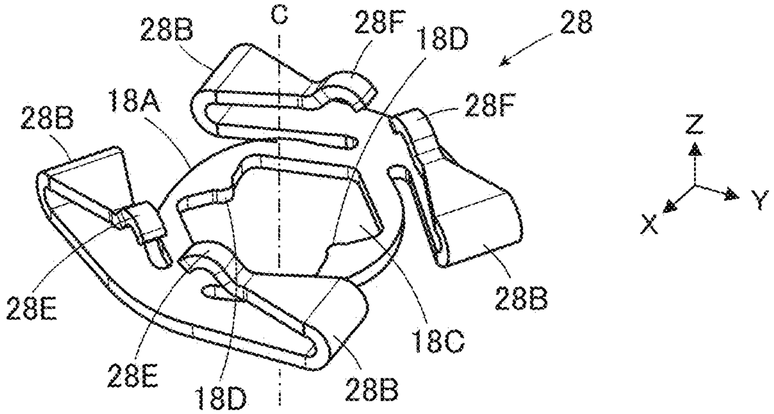
FIG. 31 is a perspective view showing an inner contact used in the connector of Embodiment 2.
Figure 32:
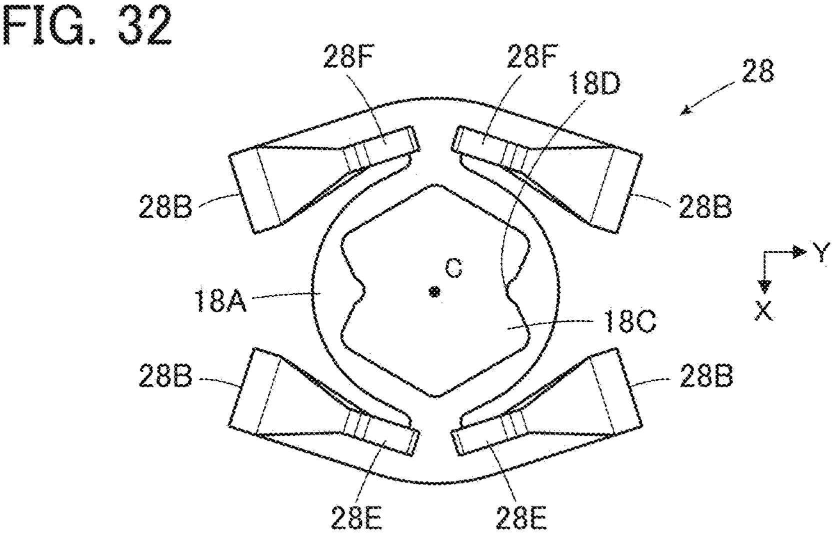
FIG. 32 is a plan view showing the inner contact used in the connector of Embodiment 2.
Figure 33:
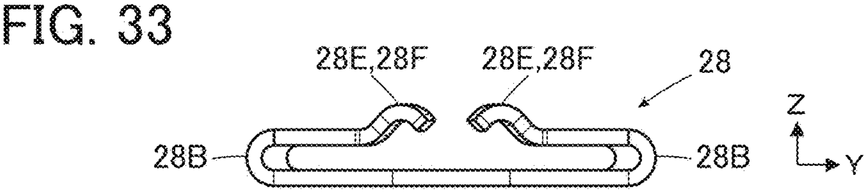
FIG. 33 is a front view showing the inner contact used in the connector of Embodiment 2.

As shown in FIGS. 31 to 33, the inner contact 28 is formed of a single metal sheet having conductivity and being bent, and has the base portion 18A of flat plate shape extending along an XY plane and four arm portions 28B joined to an outer peripheral portion of the base portion 18A.

Two arm portions 28B of the four arm portions 28B separately extend in the +Y direction and the −Y direction from the +X directional end portion of the base portion 18A, rise in the +Z direction, and are bent so as to return to the +X directional end portion of the base portion 18A. These two arms 28B form, on the +X direction side of the fitting axis C, a pair of first elastic portions 28E each having a cantilever shape being bent to project in the +Z direction with respect to the base portion 18A and being elastically deformable in the Z direction.

Similarly, remaining two arm portions 28B of the four arm portions 28B separately extend in the +Y direction and the −Y direction from the −X directional end portion of the base portion 18A, rise in the +Z direction, and are bent so as to return to the −X directional end portion of the base portion 18A. These two arms 28B form, at separate rotational positions about the fitting axis C different from the positions of the pair of first elastic portions 28E, specifically, on the −X direction side from the fitting axis C, a pair of second elastic portions 28F each having a cantilever shape being bent to project in the +Z direction with respect to the base portion 18A and being elastically deformable in the Z direction.

As with the base portion 18A of the inner contact 18 in Embodiment 1, the base portion 18A has the through-hole 18C through which the fitting axis C passes, and the pair of projections 18D formed to separately project from the +Y and −Y directional edge portions of the through-hole 18C toward the fitting axis C.

The sheet type conductive member 25 has the same configuration as that of the sheet type conductive member 15 used in Embodiment 1 except that they are different in shapes of the contact arrangement region and the opening portion.

Figure 34:
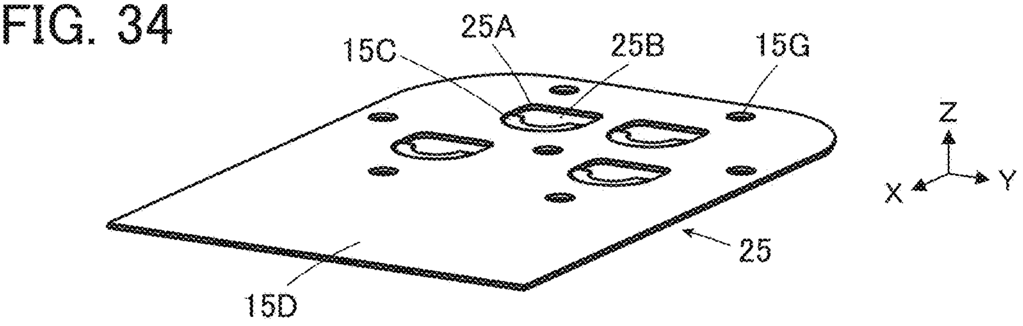
FIG. 34 is a perspective view showing a connection object to be connected to the connector of Embodiment 2 when viewed from an obliquely upper position.

In other words, as shown in FIG. 34, four contact arrangement regions 25A for separately arranging the four plug contacts 13 are defined on a front surface, facing in the +Z direction, of the sheet type conductive member 25. In each contact arrangement region 25A, an opening portion 25B is formed to penetrate the sheet type conductive member 25 in the Z direction, and the wiring layer 15C is exposed toward the +Z direction so as to be adjacent to the opening portion 25B of the +X direction side thereof. In a remaining region excluding the four contact arrangement regions 25A, the insulating layer 15D is exposed.

Figure 35:
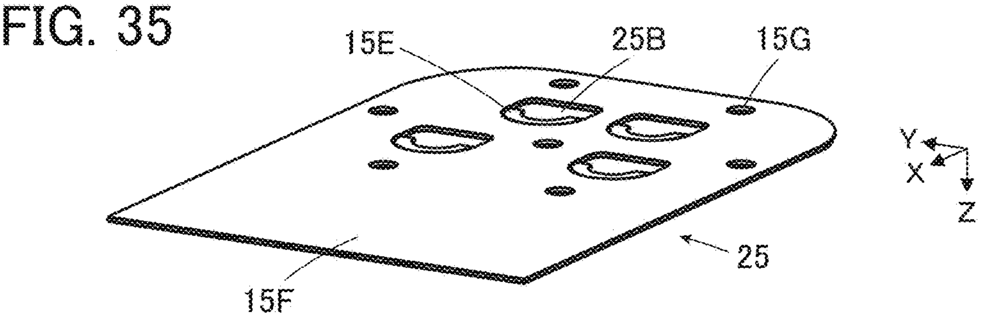
FIG. 35 is a perspective view showing the connection object to be connected to the connector of Embodiment 2 when viewed from an obliquely lower position.

Since the opening portions 25B penetrate the sheet type conductive member 25 in the Z direction, as shown in FIG. 35, the opening portions 25B can be seen also on a rear surface, facing in the −Z direction, of the sheet type conductive member 25 at the positions corresponding to the four contact arrangement regions 25A.

On the rear surface, facing in the −Z direction, of the sheet type conductive member 25, the wiring layer 15E is exposed toward the −Z direction so as to be adjacent to each of the opening portions 25B on the +X direction side thereof, the opening portions 25B being formed at the positions corresponding to the four contact arrangement regions 25A, and in a remaining region excluding the opening portions 25B, the insulating layer 15F is exposed.

The plurality of through-holes 15G separately corresponding to the plurality of bosses 16C of the top insulator 16 are formed at a peripheral portion of the sheet type conductive member 25.

Figure 36:
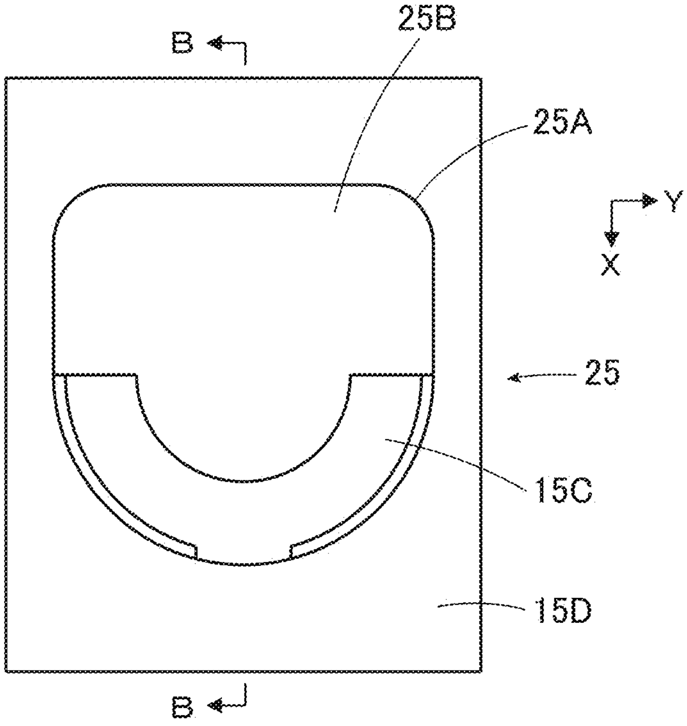
FIG. 36 is a partial plan view showing the connection object to be connected to the connector of Embodiment 2.

As shown in FIG. 36, the contact arrangement region 25A is composed of a semicircular portion situated on the +X direction side thereof and a rectangular portion that is adjacent to the semicircular portion on the −X direction side thereof and has round corners, and a region of the wiring layer 15C is exposed toward the +Z direction, the region extending in a U shape with a predetermined width along an inner side of a contour of the semicircular portion on the +X direction side of the contact arrangement region 25A. In a remaining region of the contact arrangement region 25A excluding the region where the wiring layer 15C is exposed, the opening portion 25B is formed.

As with the wiring layer 15C, on the rear surface, facing in the −Z direction, of the sheet type conductive member 25, a region of the wiring layer 15E is exposed toward the −Z direction, the region extending in a U shape with a predetermined width along the inner side of the contour of the semicircular portion on the +X direction of the contact arrangement region 25A.

Figure 37:
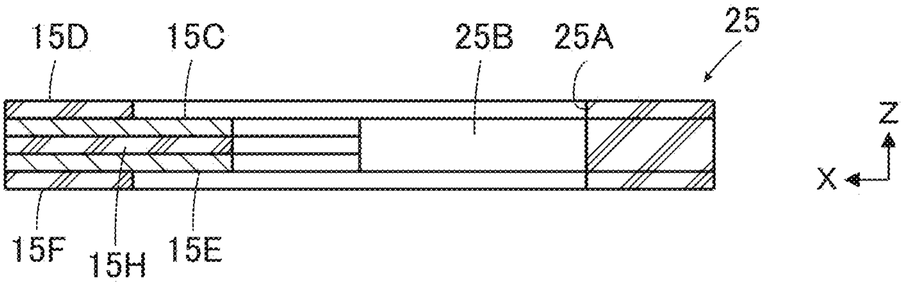
FIG. 37 is a cross-sectional view taken along line B-B in FIG. 36.

As shown in FIG. 37, the wiring layer 15C exposed toward the +Z direction and the wiring layer 15E exposed toward the −Z direction are laminated via the insulating layer 15H.

The four contact through-holes 16B of the top insulator 16, the four plug contacts 13, the four contact arrangement regions 25A of the sheet type conductive member 25, the four inner contacts 28, and the four inner contact accommodating portions 27B of the bottom insulator 27 are arranged so as to align with each other in the Z direction.

In addition, the bosses 16C of the top insulator 16, the cutouts 14B of the reinforcement sheet 14, the through-holes 15G of the sheet type conductive member 25, and the through-holes 17D of the bottom insulator 27 are arranged so as to align with each other in the Z direction.

Figure 38:
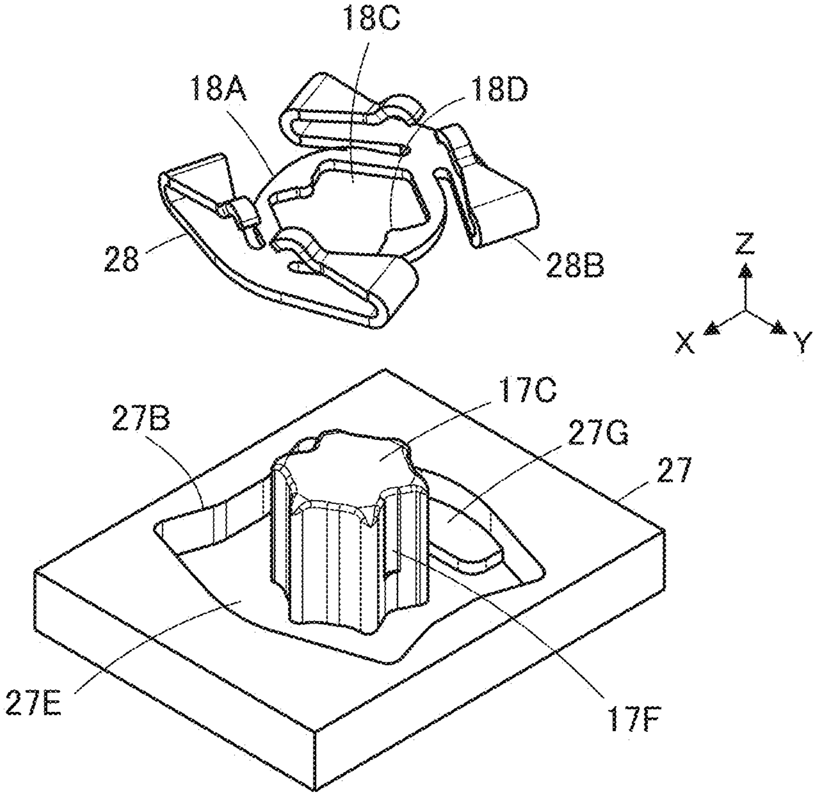
FIG. 38 is a perspective view showing a state where the inner contact is positionally aligned with the bottom insulator in Embodiment 2.
Figure 39:
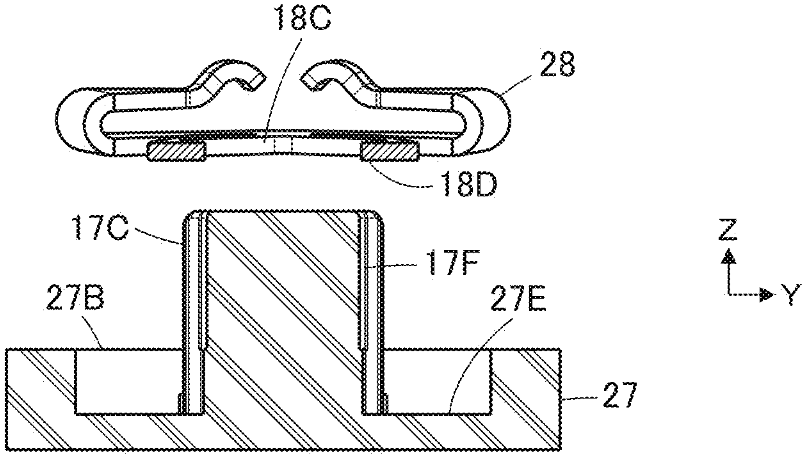
FIG. 39 is a cross-sectional front view showing the state where the inner contact is positionally aligned with the bottom insulator in Embodiment 2.

When the connector 21 is assembled, first, as shown in FIGS. 38 and 39, the inner contact 28 is positionally aligned with the corresponding inner contact accommodating portion 27B of the bottom insulator 27 on the +Z direction side thereof. At this time, the base portion 18A and the four arm portions 28B of the inner contact 28 are situated on the +Z direction side of the corresponding inner contact accommodating portion 27B of the bottom insulator 27, and the through-hole 18C formed in the base portion 18A is situated on the +Z direction side of the protrusion portion 17C projecting from the inner contact accommodating portion 27B.

Figure 40:
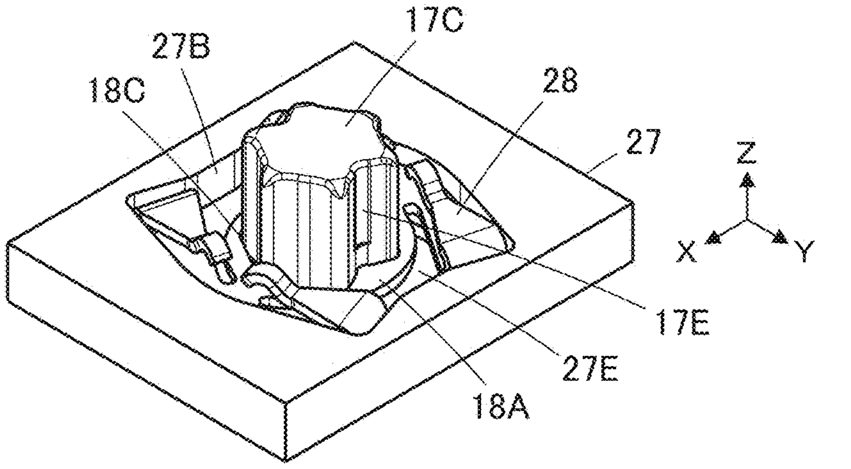
FIG. 40 is a perspective view showing a state where the inner contact is disposed on the bottom insulator in Embodiment 2.
Figure 41:
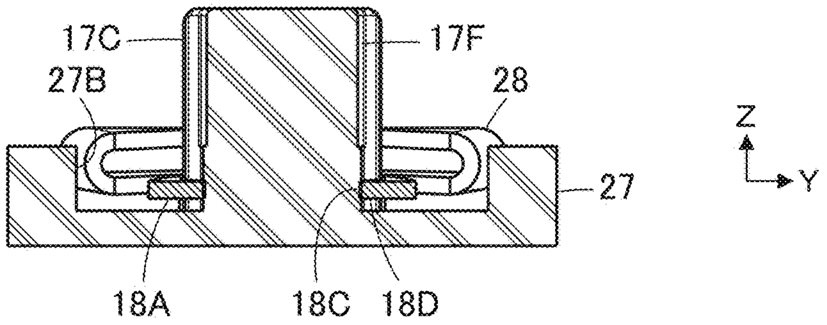
FIG. 41 is a cross-sectional front view showing the state where the inner contact is disposed on the bottom insulator in Embodiment 2.

Next, the inner contact 28 is pushed in the −Z direction toward the bottom insulator 27 while the protrusion portion 17C of the bottom insulator 27 is inserted into the through-hole 18C of the inner contact 28. At this time, the inner contact 28 is pushed, having the pair of projections 18D projecting in the through-hole 18C of the inner contact 28 separately inserted in the pair of projection accommodating portions 17F of the protrusion portion 17C of the bottom insulator 27, and as shown in FIGS. 40 and 41, the protrusion portion 17C of the bottom insulator 27 is press-fitted into the through-hole 18C of the inner contact 28. Thus, the inner contact 28 is accommodated in the inner contact accommodating portion 27B and fixed to the bottom insulator 27.

Figure 42:
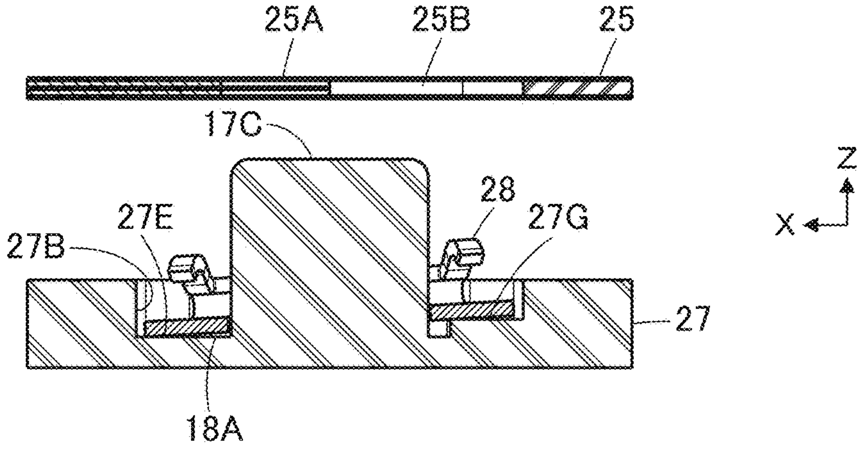
FIG. 42 is a cross-sectional side view showing a state where the connection object is positionally aligned with the bottom insulator in Embodiment 2.

Further, the sheet type conductive member 25 is positionally aligned with the bottom insulator 27 on the +Z direction side thereof as shown in FIG. 42. At this time, the contact arrangement region 25A and the opening portion 25B of the sheet type conductive member 25 are situated on the +Z direction side of the corresponding inner contact accommodating portion 27B of the bottom insulator 27.

Since the step portion 27G is formed at the −X directional end portion of the inner contact accommodating portion 27B of the bottom insulator 27, a +X directional portion of the inner contact 28 accommodated in the inner contact accommodating portion 27B is situated on the support surface 27E of the inner contact accommodating portion 27B, while a −X directional portion of the inner contact 28 is situated on the step portion 27G. Therefore, the inner contact 28 is retained by the inner contact accommodating portion 27B while being inclined with respect to an XY plane.

Figure 43:
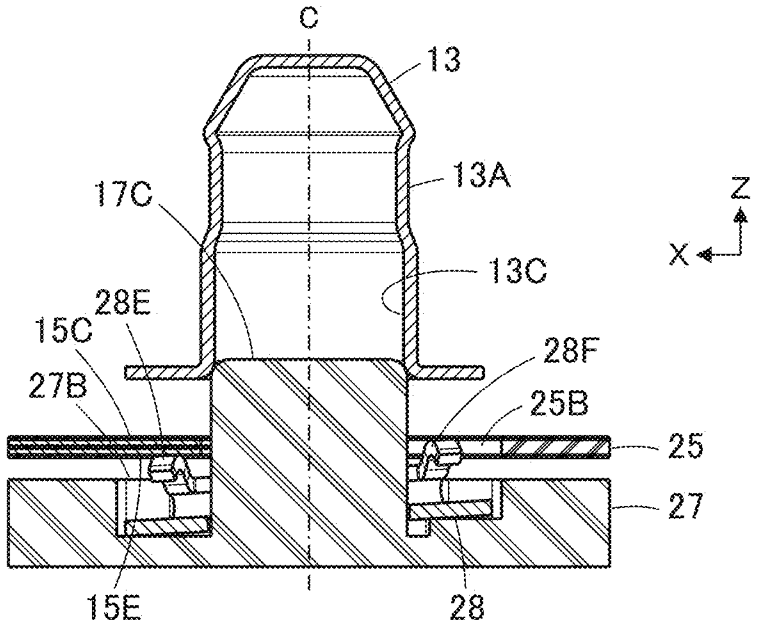
FIG. 43 is a cross-sectional side view showing a press-fitting start state of the protrusion portion of the bottom insulator with respect to the plug contact in Embodiment 2.

When the sheet type conductive member 25 is moved toward the bottom insulator 27 relatively in the −Z direction, the protrusion portion 17C of the bottom insulator 27 is inserted into the opening portion 25B of the sheet type conductive member 25 as shown in FIG. 43.

Here, the wiring layers 15C and 15E of the sheet type conductive member 25 are respectively exposed toward the +Z direction and the −Z direction on the +X direction side of the opening portion 25B. Therefore, in the inner contact 28 retained by the inner contact accommodating portion 27B of the bottom insulator 27, the pair of first elastic portions 28E disposed on the +X direction side of the fitting axis C are situated on the −Z direction side of the exposed part of the wiring layer 15E of the sheet type conductive member 25, while the pair of second elastic portions 28F disposed on the −X direction side from the fitting axis C are exposed toward the +Z direction via the opening portion 25B of the sheet type conductive member 25.

Further, the corresponding plug contact 13 is positionally aligned with the inner contact accommodating portion 27B of the bottom insulator 27 on the +Z direction side thereof. At this time, the recessed portion 13C of the tubular portion 13A of the plug contact 13 is situated on the +Z direction side of the protrusion portion 17C of the bottom insulator 27.

Figure 44:
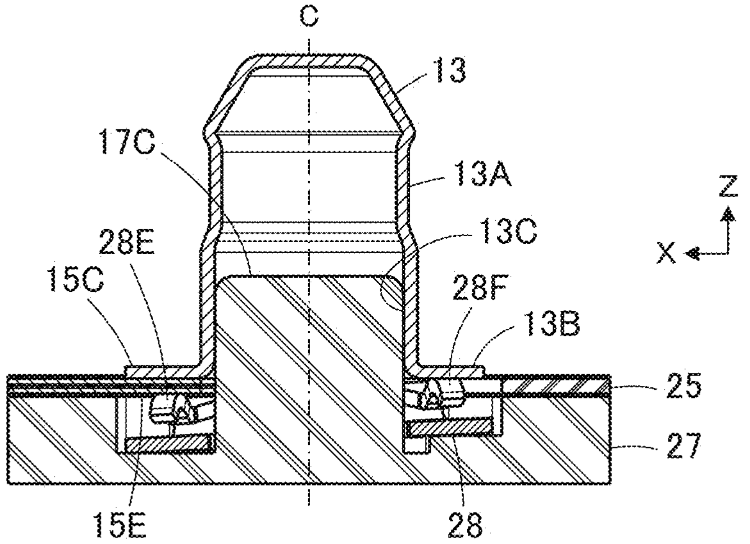
FIG. 44 is a cross-sectional side view showing a press-fitting completion state of the protrusion portion of the bottom insulator with respect to the plug contact in Embodiment 2.

Next, the plug contact 13 is pushed toward the bottom insulator 27 relatively in the −Z direction, and the protrusion portion 17C of the bottom insulator 27 is press-fitted into the recessed portion 13C of the tubular portion 13A of the plug contact 13 as shown in FIG. 44.

As a result, on the +X direction side of the fitting axis C, the pair of first elastic portions 28E of the inner contact 28 are pushed in the −Z direction and elastically deformed by the flange 13B of the plug contact 13 via the sheet type conductive member 25, and on the −X direction side of the fitting axis C, the pair of second elastic portions 28F of the inner contact 28 are pushed in the −Z direction and elastically deformed directly by the flange 13B of the plug contact 13.

In other words, on the +X direction side of the fitting axis C, the sheet type conductive member 25 is sandwiched between the flange 13B of the plug contact 13 and the pair of first elastic portions 28E of the inner contact 28, and on the −X direction side of the fitting axis C, the flange 13B of the plug contact 13 makes contact with the pair of second elastic portions 28F of the inner contact 28.

Figure 45:
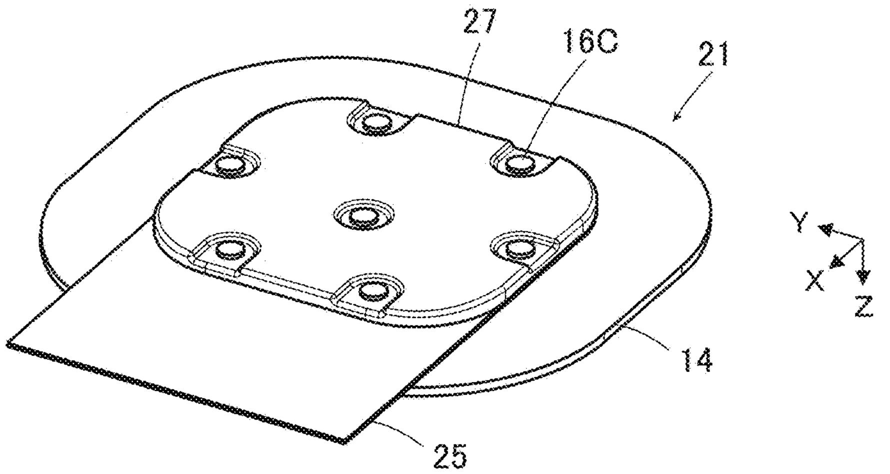
FIG. 45 is a perspective view showing the connector assembly of Embodiment 2 when viewed from an obliquely lower position.

In addition, by pressing the bottom insulator 27 against the top insulator 16, the bosses 16C of the top insulator 16 sequentially penetrate the cutouts 14B of the reinforcement sheet 14, the through-holes 15G of the sheet type conductive member 25, and the through-holes 17D of the bottom insulator 27. Thereafter, as shown in FIG. 45, the top insulator 16 and the bottom insulator 27 are fixed to each other through heat deformation of a tip of each of the plurality of bosses 16C projecting on the −Z direction side of the bottom insulator 27. Thus, the assembling operation of the connector 21 connected to the sheet type conductive member 25 is completed.

Figure 46:
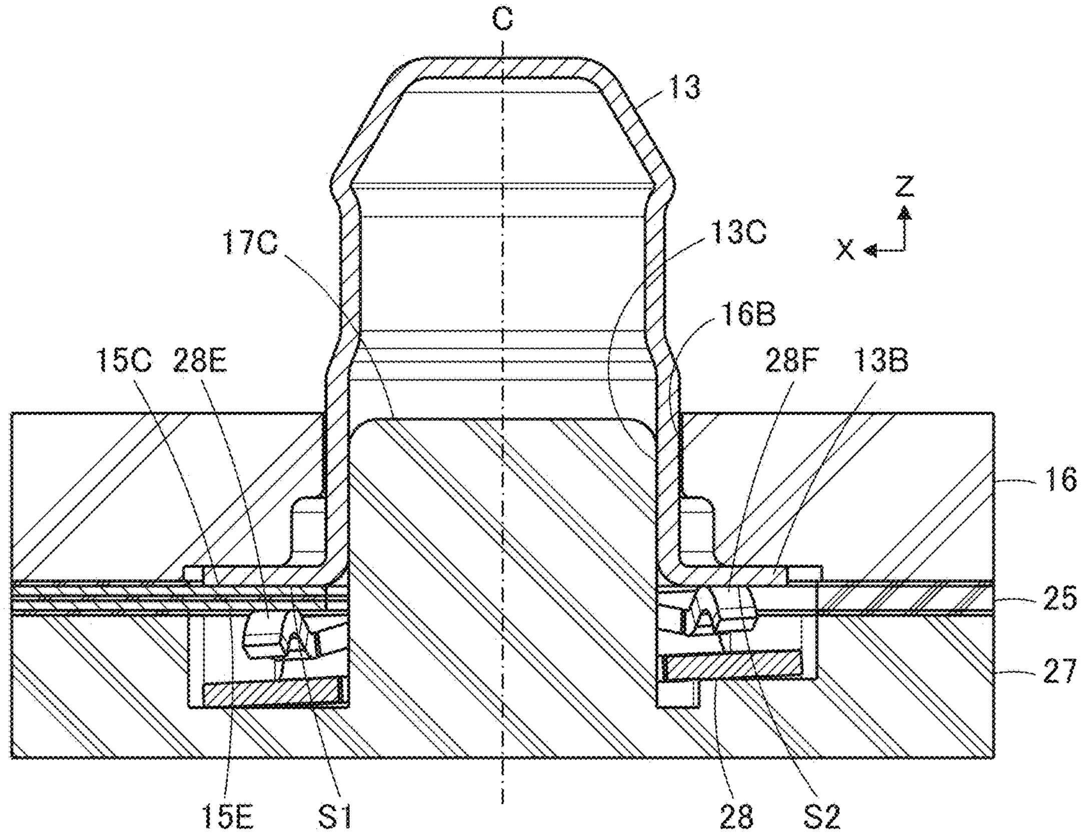
FIG. 46 is a partial cross-sectional view showing the connector assembly of Embodiment 2.
Figure 47:
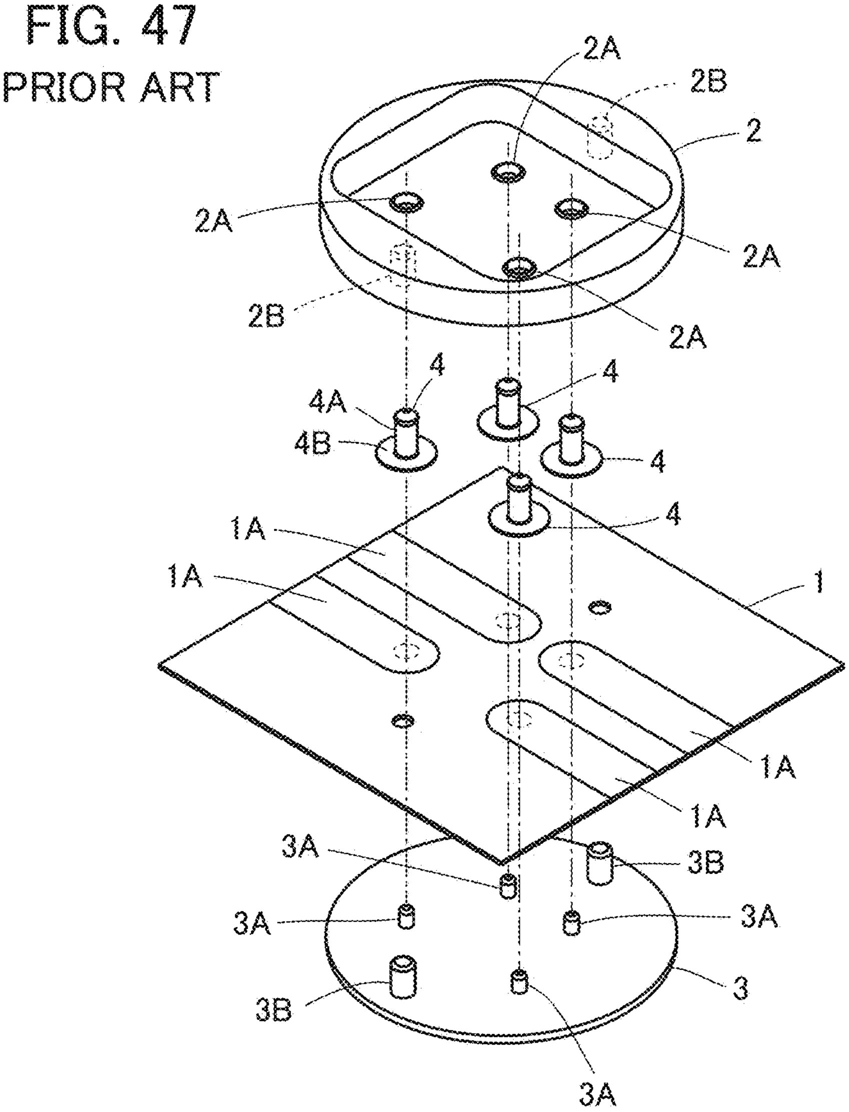
FIG. 47 PRIOR ART
FIG. 47 is an exploded perspective view of a conventional connector.
Figure 48:
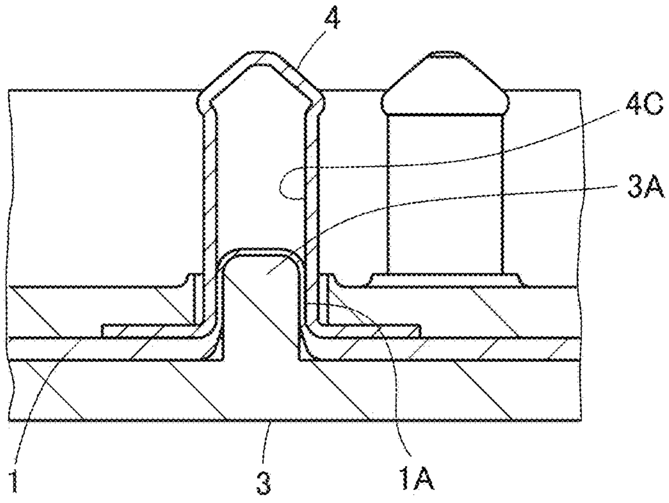
FIG. 48 PRIOR ART
FIG. 48 is a partial cross-sectional view showing the conventional connector.

In the thus-assembled connector 21, as shown in FIG. 46, on the +X direction side of the fitting axis C, the sheet type conductive member 25 is sandwiched between the flange 13B of the plug contact 13 and the pair of first elastic portions 28E of the inner contact 28.

Thus, a first contacting part S1 formed of part of a −Z directional surface of the flange 13B of the plug contact 13 makes contact with the wiring layer 15C of the sheet type conductive member 25 with predetermined contact pressure, and the plug contact 13 is electrically connected with the wiring layer 15C. In addition, +Z directional surfaces of the pair of first elastic portions 28E of the inner contact 28 make contact with the wiring layer 15E of the sheet type conductive member 25 with predetermined contact pressure, and the inner contact 28 is electrically connected with the wiring layer 15E.

On the other hand, on the −X direction side of the fitting axis C, a second contacting part S2 formed of part, at a different position from the first contacting part S1, of the −Z directional surface of the flange 13B of the plug contact 13 makes direct contact with the pair of second elastic portions 28F of the inner contact 28 with predetermined contact pressure, and the plug contact 13 is electrically connected to the inner contact 28.

Therefore, the wiring layer 15C exposed on the front surface of the sheet type conductive member 25 is electrically connected to the plug contact 13 directly, while the wiring layer 15E exposed on the rear surface of the sheet type conductive member 25 is electrically connected to the plug contact 13 via the inner contact 28. That is, both the wiring layers 15C and 15E are connected to the plug contact 13.

Thus, with the connector 21, by using the inner contact 28, both the wiring layer 15C and the wiring layer 15E respectively formed of the conductors disposed on the front surface side and the rear surface side of the sheet type conductive member 25 can be electrically connected to the single plug contact 13 as with the connector 11 of Embodiment 1.

Therefore, when the connector 21 is connected to a sheet type conductive member having a conductor exposed only on its front surface side, the plug contact 13 can be electrically connected to the conductor on the front surface side of the sheet type conductive member. On the other hand, when the connector 21 is connected to a sheet type conductive member having a conductor exposed only on its rear surface side, the plug contact 13 can be electrically connected to the conductor on the rear surface side of the sheet type conductive member.

Further, when the connector 21 is connected to a sheet type conductive member having conductors separately exposed on its front surface side and rear surface side like the sheet type conductive member 25 in Embodiment 2 above, the plug contact 13 can be electrically connected to both the conductors on the front surface side and the rear surface side of the sheet type conductive member. For example, assuming that a connection object is a sheet type conductive member having a multilayer structure in which conductors constituting shield layers are separately exposed on the front surface side and the rear surface side and a conductor constituting a signal wiring layer is disposed between these shield layers so as to be insulated from both the shield layers, a shield effect is exhibited to the signal wiring layer when the plug contact 13 connected to the shield layers on the front surface side and the rear surface side is connected to a ground potential, and it is possible to carry out highly accurate signal transmission with reduced influence of external disturbances caused by, for example, electromagnetic waves.

Also in Embodiment 2, as with Embodiment 1, the protrusion portion 17C of the bottom insulator 27 is press-fitted into the recessed portion 13C of the tubular portion 13A of the plug contact 13, whereby the plug contact 13 is retained by the bottom insulator 27. In addition, also by fixing the top insulator 16 to the bottom insulator 27 using the plurality of bosses 16C of the top insulator 16, the plug contact 13 can be retained by the bottom insulator 27.

Meanwhile, in the configuration in which the protrusion portion 17C of the bottom insulator 27 is press-fitted into the recessed portion 13C of the tubular portion 13A of the plug contact 13, the plug contact 13 can be forcibly fixed to the bottom insulator 27 at a position closer to a contact portion between the wiring layer 15C of the sheet type conductive member 25 and the flange 13B of the plug contact 13, a contact portion between the wiring layer 15E of the sheet type conductive member 25 and the pair of first elastic portions 28E of the inner contact 28, and a contact portion between the flange 13B of the plug contact 13 and the pair of second elastic portions 28F of the inner contact 28, so that reliability of the electric connection between the sheet type conductive member 25 and the plug contact 13 can be improved.

While the inner contact 28 has the pair of first elastic portions 28E and the pair of second elastic portions 28F in Embodiment 2 described above, the invention is not limited thereto, and the inner contact 28 may have a single first elastic portion 28E and a single second elastic portion 28F or three or more first elastic portions 28E and three or more second elastic portions 28F.

In Embodiment 2 described above, since the inner contact accommodating portion 27B of the bottom insulator 27 includes the support surface 27E extending along an XY plane and the step portion 27G adjacent to the support surface 27E, the inner contact 28 is accommodated in the inner contact accommodating portion 27B while being inclined with respect to an XY plane; however, the invention is not limited thereto. As with Embodiment 1, since the inner contact accommodating portion 27B has a support surface inclined with respect to an XY plane and the inner contact 28 is disposed on the support surface, the inner contact 28 can be accommodated in the inner contact accommodating portion 27B while being inclined with respect to an XY plane.

Conversely, in Embodiment 1, it may be configured such that the inner contact accommodating portion 17B of the bottom insulator 17 has a support surface extending along an XY plane and a step portion adjacent to the support surface so that the inner contact 18 is accommodated in the inner contact accommodating portion 17B while being inclined with respect to an XY plane.

Meanwhile, the base portion 18A of the inner contact 18 is required to be so rigid as not to be deformed when the base portion 18A is pushed in the −Z direction by the flange 13B of the plug contact 13 in the state of lying across the support surface extending along an XY plane and the step portion.

In Embodiments 1 and 2 above, the plug contacts 13 disposed in the contact arrangement regions 15A, 25A of the sheet type conductive member 15, 25 each make contact with both the wiring layer 15C exposed on the front surface side of the sheet type conductive member 15, 25 and the wiring layer 15E exposed on the rear surface side of the sheet type conductive member 15, 25; however, for instance, it is also possible to connect only the wiring layer 15E exposed on the rear surface side of the sheet type conductive member 15, 25 to the plug contacts 13 disposed in the contact arrangement regions 15A, 25A.

While the sheet type conductive member 15, 25 used in Embodiments 1 and 2 above has a multilayer structure, the invention is not limited thereto, and it suffices if the sheet type conductive member has a conductor exposed on at least one surface thereof.

In addition, while the two layers of the conductors, i.e., the wiring layer 15C and the wiring layer 15E of the sheet type conductive member 15, 25, are connected to the single plug contact 13 in Embodiments 1 and 2 above, the invention is not limited thereto, and three or more layers of conductors may be connected to the single plug contact 13.

In addition, while the connector 11, 21 in Embodiments 1 and 2 above has the four plug contacts 13, the invention is not limited to this number of the plug contacts 13, and it suffices if the connector includes at least a single plug contact 13 to be electrically connected to a conductor exposed on at least one surface of the sheet type conductive member 15, 25.

While the reinforcement sheet 14 is disposed between the bottom insulator 17, 27 and the top insulator 16 in Embodiments 1 and 2 above, the reinforcement sheet 14 may be omitted when it is not necessary to reinforce a mounting object such as a garment to which the connector 11, 21 is to be attached.

What is claimed is:

1. A connector comprising:

a plug contact having conductivity and including a tubular portion extending along a fitting axis, and a flange extending from an end portion of the tubular portion in an orthogonal direction orthogonal to the fitting axis;

a bottom insulator having a support surface extending in the orthogonal direction or a direction inclined with respect to the orthogonal direction; and an inner contact having conductivity and being disposed on the support surface, wherein the inner contact includes a base portion of flat plate shape disposed on the support surface, and a first elastic portion and a second elastic portion that are joined to the base portion to face a rear surface of the flange and are elastically deformable in a direction along the fitting axis, and part of a connection object of sheet shape having a conductor exposed on at least one surface of the connection object is sandwiched between a first contacting part of the rear surface of the flange of the plug contact and the first elastic portion of the inner contact in the direction along the fitting axis, the first contacting part of the rear surface of the flange makes contact with a front surface of the connection object, the first elastic portion makes contact with the rear surface of the connection object, and a second contacting part of the rear surface of the flange makes contact with the second elastic portion, the second contacting part being different in position from the first contacting part, whereby the plug contact is electrically connected to the conductor directly when the conductor is exposed on the front surface of the connection object, and the plug contact is electrically connected to the conductor via the inner contact when the conductor is exposed on the rear surface of the connection object.

2. The connector according to claim 1, wherein the inner contact is formed of a metal sheet being bent, and the first elastic portion and the second elastic portion are situated at different positions from each other about the fitting axis and each have a double-sided beam shape curved so as to project from the support surface in the direction along the fitting axis with respect to the base portion.

3. The connector according to claim 1, wherein the inner contact is formed of a metal sheet being bent, and the first elastic portion and the second elastic portion are situated at different positions from each other about the fitting axis and each have a cantilever shape being bent to project from the support surface in the direction along the fitting axis with respect to the base portion.

4. The connector according to claim 1, wherein the first elastic portion and the second elastic portion are separately disposed at positions facing each other across the fitting axis.

5. The connector according to claim 4, wherein the base portion of the inner contact is disposed to be inclined with respect to the orthogonal direction such that the second elastic portion is situated closer to the rear surface of the flange than the first elastic portion is.

6. The connector according to claim 5, wherein the support surface extends in a direction inclined with respect to the orthogonal direction, and the inner contact is disposed such that a whole of the base portion makes contact with the support surface.

7. The connector according to claim 5, wherein the support surface extends in the orthogonal direction, the bottom insulator has a step portion formed at a position adjacent to the support surface and facing the second contacting part of the rear surface of the flange, and the inner contact is disposed such that, part of the inner contact on a side closer to the first elastic portion makes contact with the support surface and part of the inner contact on another side closer to the second elastic portion makes contact with the step portion.

8. The connector according to claim 1, wherein the plug contact includes a recessed portion formed inside the tubular portion, the bottom insulator has a protrusion portion that projects from the support surface along the fitting axis and is inserted into the recessed portion of the plug contact, and when the protrusion portion is press-fitted into the recessed portion, the plug contact is fixed to the bottom insulator.

9. The connector according to claim 8, wherein the base portion of the inner contact has a through-hole through which the protrusion portion of the bottom insulator is inserted, and a projection projecting from an edge portion of the through-hole toward the fitting axis, the protrusion portion of the bottom insulator has a projection accommodating portion of recess shape, and the protrusion portion of the bottom insulator is inserted into the through-hole, and the projection is accommodated in the projection accommodating portion of the bottom insulator, whereby a position of the inner contact relative to the bottom insulator is fixed.

10. The connector according to claim 1, wherein the inner contact includes a plurality of the first elastic portions and a plurality of the second elastic portions, the plurality of the first elastic portions and the plurality of the second elastic portions being joined to the base portion.

11. The connector according to claim 1, comprising a top insulator provided with a contact through-hole through which the tubular portion of the plug contact passes and which is smaller than the flange, wherein the top insulator is fixed to the bottom insulator such that the tubular portion of the plug contact passes through the contact through-hole and that the flange of the plug contact, the connection object, and the inner contact are sandwiched between the top insulator and the bottom insulator.

12. A connector assembly comprising:

a connection object; and the connector according to claim 1, the connector being connected to the connection object, wherein the connection object includes a connection portion formed at a position corresponding to the first elastic portion of the inner contact, and an opening portion formed at a position corresponding to the second elastic portion of the inner contact, the connection portion of the connection object is sandwiched between the first contacting part of the rear surface of the flange and the first elastic portion of the inner contact as a part of the connection object, and the second contacting part of the rear surface of the flange makes contact with the second elastic portion of the inner contact via the opening portion.

* * * * *